(12) United States Patent
Hoshino et al.

(10) Patent No.: US 12,072,297 B2
(45) Date of Patent: Aug. 27, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Shoichi Hoshino, Tokyo (JP); Atsushi Nogami, Kanagawa (JP); Kazuhiko Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 17/744,230

(22) Filed: May 13, 2022

(65) Prior Publication Data

US 2022/0373475 A1 Nov. 24, 2022

(30) Foreign Application Priority Data

May 19, 2021 (JP) .................... 2021-084603

(51) Int. Cl.
*G01N 21/88* (2006.01)
*G06T 7/00* (2017.01)

(52) U.S. Cl.
CPC ......... *G01N 21/8851* (2013.01); *G06T 7/001* (2013.01); *G01N 2021/8861* (2013.01); *G01N 2021/887* (2013.01)

(58) Field of Classification Search
CPC ....... G01N 21/8851; G01N 2021/8861; G01N 2021/887; G06T 7/001
See application file for complete search history.

(56) References Cited

U.S. PATENT DOCUMENTS

| | | | | |
|---|---|---|---|---|
| 8,340,395 B2* | 12/2012 | Sakai | ................. | G06F 18/2433 |
| | | | | 382/149 |
| 9,170,543 B2* | 10/2015 | Arakawa | ................. | G06T 7/001 |
| 11,802,841 B2* | 10/2023 | Takagi | ................. | G03F 7/7065 |
| 11,854,183 B2* | 12/2023 | Takahashi | ............. | G06T 7/0008 |

FOREIGN PATENT DOCUMENTS

JP 2019020220 A 2/2019

* cited by examiner

*Primary Examiner* — Hung V Nguyen
(74) *Attorney, Agent, or Firm* — Canon U.S.A., Inc. IP Division

(57) ABSTRACT

An information processing apparatus selects, as a reference defect, at least one defect from among first defects associated with a first image and selects, as a correction target defect, at least one defect from among second defects associated with a second image captured at a time different from an image capturing time of the first image. Additionally, the information processing apparatus generates a correction candidate by modifying the correction target defect, acquires a matching level representing a matching relationship between the reference defect and the correction candidate, and generates a corrected defect by correcting the correction target defect based on the matching level. Then, the information processing apparatus acquires a progress level representing a change in defect from the reference defect based on a comparison between the reference defect and the corrected defect.

29 Claims, 27 Drawing Sheets

FIG.3C

| ID | DEFECT TYPE | COORDINATES | NUMERICAL VALUE | MAXIMUM WIDTH | TOTAL EXTENSION/ CONTOUR LENGTH | AREA |
|---|---|---|---|---|---|---|
| C001 | CRACK | (Xc001_1, Yc001_1), ..., (Xc001_n, Yc001_n) | 0.5 mm, ..., 0.2 mm | 0.8 mm | 0.5 m | 0.01 m$^2$ |
| C002 | CRACK | (Xc002_1, Yc002_1), ..., (Xc002_m, Yc002_m) | 0.3 mm, ..., 0.1 mm | 0.4 mm | 0.4 m | 0.01 m$^2$ |
| C003 | CRACK | (Xc003_1, Yc003_1), ..., (Xc003_p, Yc003_p) | 1.2 mm, ..., 0.8 mm | 1.2 mm | 0.9 m | 0.03 m$^2$ |
| T001 | REINFORCING BAR EXPOSURE | (Xt001_1, Yt001_1), ..., (Xt001_q, Yt001_q) | 7.0 mm, ..., 2.5 mm | 7.3 mm | 1.5 m | 0.25 m$^2$ |
| ... | ... | ... | ... | ... | ... | ... |
| Cxxx | CRACK | (Xcxxx_1, Ycxxx_1), ..., (Xcxxx_r, Ycxxx_r) | 0.1 mm, ..., 0.2 mm | 0.6 mm | 0.7 m | 0.02 m$^2$ |

331

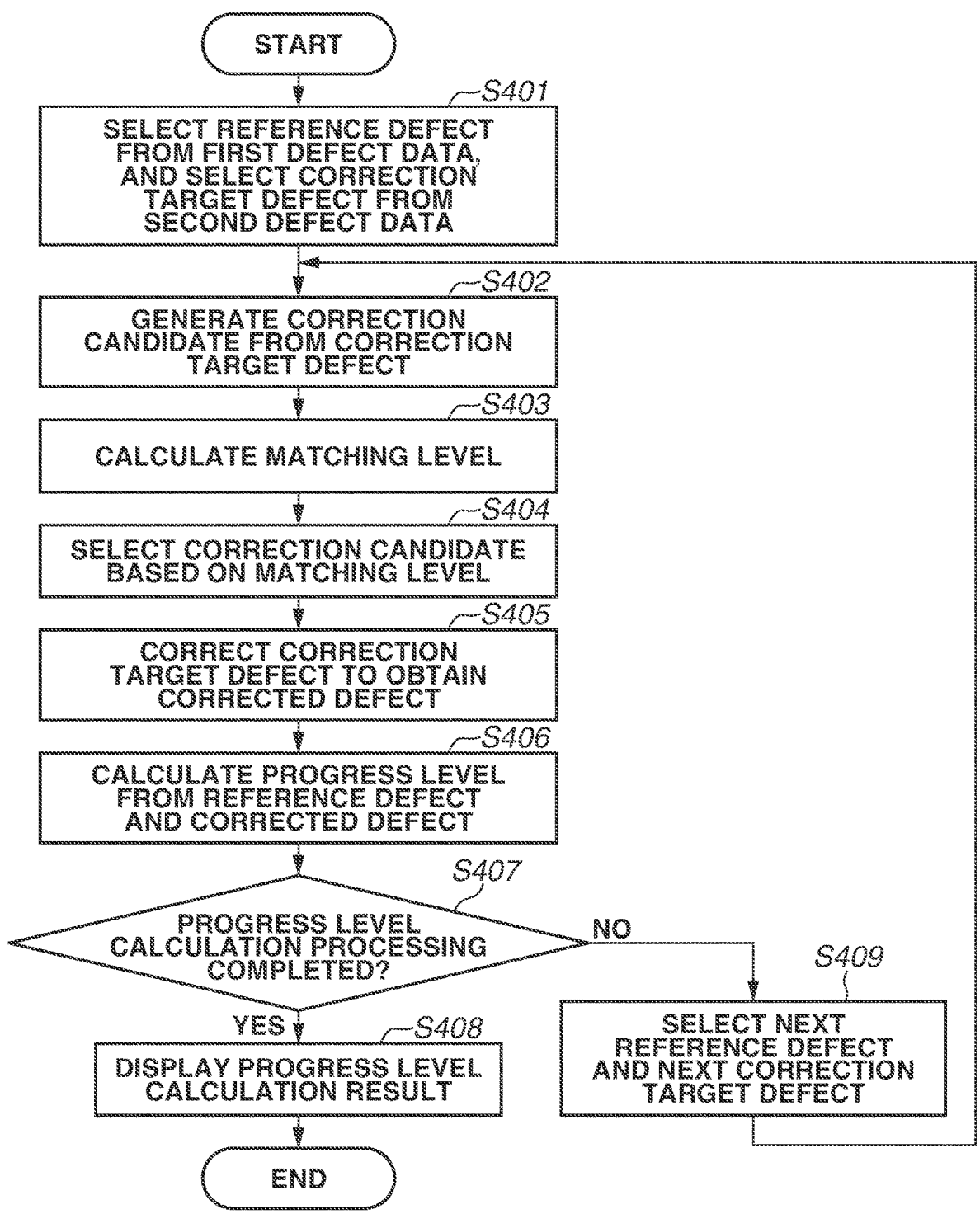

FIG.8A
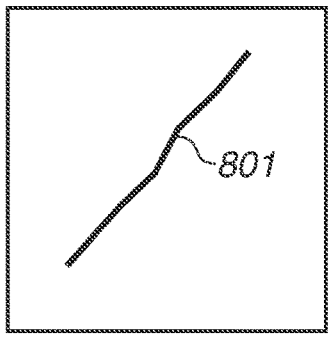
FIG.8B
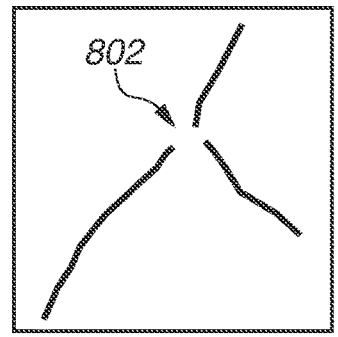
FIG.8C
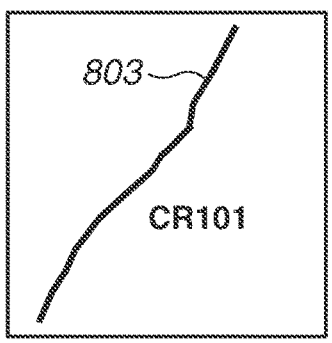
FIG.8D
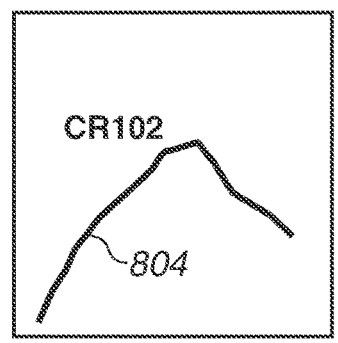
FIG.8E
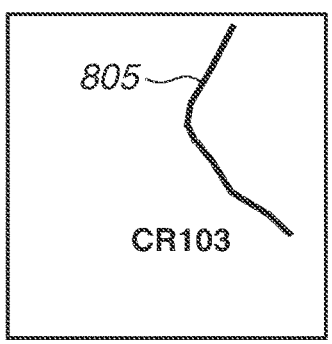
FIG.8F
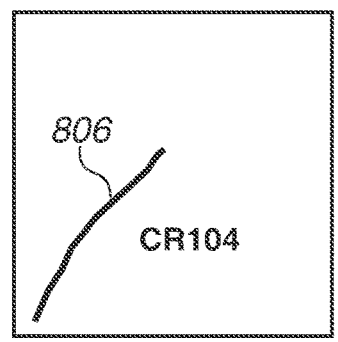
FIG.8G  811
| ID | MATCHING LEVEL |
|---|---|
| CR101 | 0.8 |
| CR102 | 0.5 |
| CR103 | 0.3 |
| CR104 | 0.6 |
FIG.8H  812
| ID | MATCHING LEVEL |
|---|---|
| CR201 | 0.6 |
| CR202 | 0 |
| CR203 | 0.75 |
| CR204 | 0.75 |

| ID | DEFECT TYPE | COORDINATES | NUMERICAL VALUE | MAXIMUM WIDTH | TOTAL EXTENSION/ CONTOUR LENGTH | AREA |
|---|---|---|---|---|---|---|
| CR111 | CRACK | (Xc001_1, Yc001_1), ..., (Xc001_n, Yc001_n) | 0.5 mm, ..., 0.2 mm | 0.8 mm | 0.5 m | 0.01 m² |
| CR112 | CRACK | (Xc002_1, Yc002_1), ..., (Xc002_m, Yc002_m) | 0.3 mm, ..., 0.1 mm | 0.4 mm | 0.4 m | 0.01 m² |
| CR113 | CRACK | (Xc003_1, Yc003_1), ..., (Xc003_p, Yc003_p) | 1.2 mm, ..., 0.8 mm | 1.2 mm | 0.9 m | 0.03 m² |

| ID | DEFECT TYPE | COORDINATES | NUMERICAL VALUE | MAXIMUM WIDTH | TOTAL EXTENSION/ CONTOUR LENGTH | AREA |
|---|---|---|---|---|---|---|
| CR113 | CRACK | (Xc003_1, Yc003_1), ..., (Xc003_p, Yc003_p) | 1.2 mm, ..., 0.8 mm | 1.2 mm | 0.9 m | 0.03 m² |
| CR114 | CRACK | (Xc001_1, Yc001_1), ..., (Xc002_m, Yc002_m) | 0.5 mm, ..., 0.8 mm | 0.8 mm | 0.9 m | 0.02 m² |

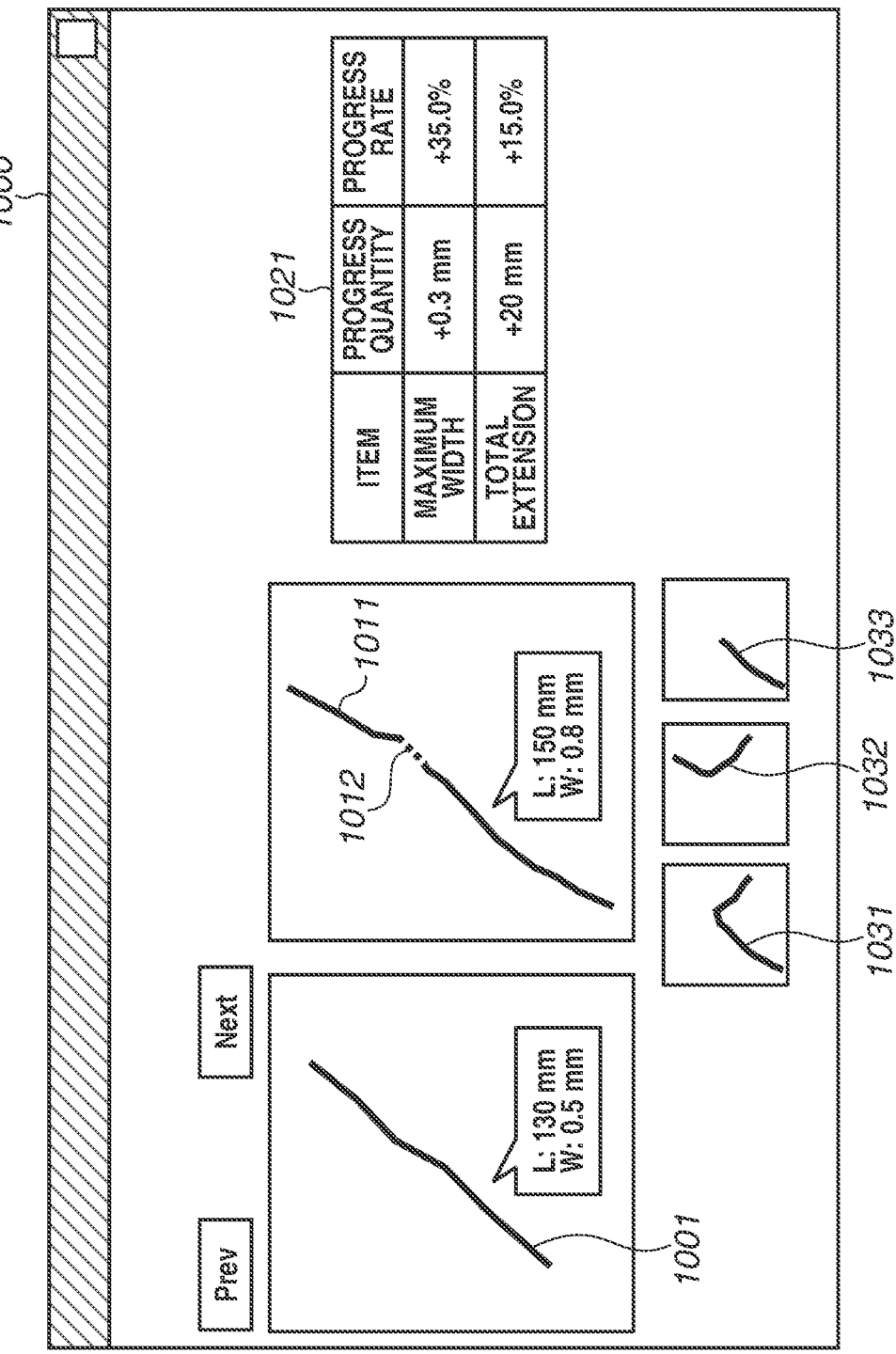

FIG.17A
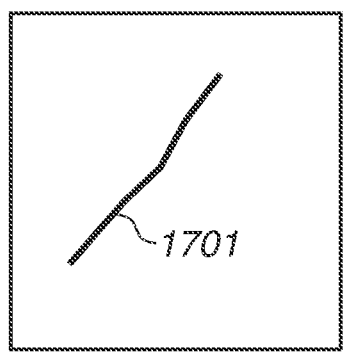
FIG.17B
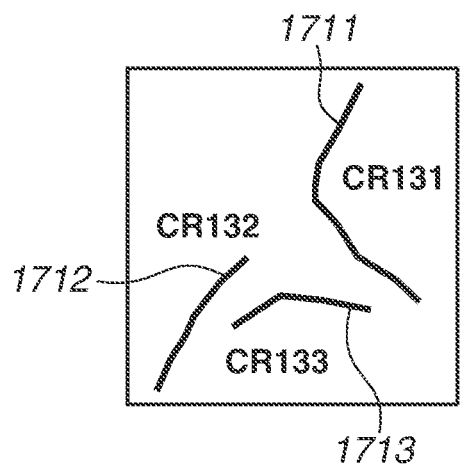
FIG.17C
| ID | MATCHING LEVEL |
|---|---|
| CR131 | 0.2 |
| CR132 | 0.5 |
| CR133 | 0 |
FIG.17D
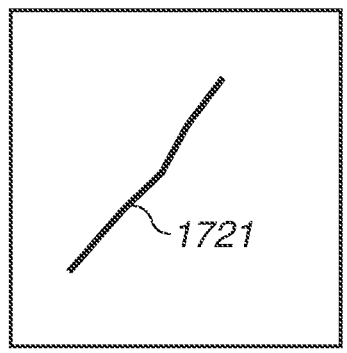
FIG.17E
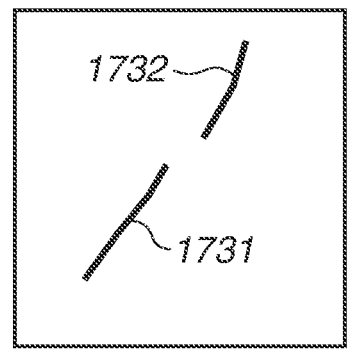

FIG.22G

| CORRECTION CANDIDATE GROUP | GROUP MATCHING LEVEL |
|---|---|
| 2221 | 0.5 |
| 2222 | 0.7 |
| 2223 | 0.6 |
| 2224 | 0.4 |

| CORRECTION CANDIDATE GROUP | GROUP MATCHING LEVEL |
|---|---|
| 2251 | 0.55 |
| 2252 | 0.35 |
| 2253 | 0.76 |
| 2254 | 0.76 |

2241

INFORMATION PROCESSING APPARATUS, INFORMATION PROCESSING METHOD, AND STORAGE MEDIUM

BACKGROUND

Field of the Disclosure

Aspects of the present disclosure generally relate to an information processing technique using an image obtained by performing image capturing of, for example, a structure.

Description of the Related Art

In inspection of a structure, such as a bridge or tunnel, to determine the degree of soundness of a member included in the structure, it is required to find how a defect, such as a crack or reinforcing bar exposure, occurring at a wall surface of the structure has advanced (i.e., grasp a temporal change of defect).

In inspecting an infrastructure with use of an image, defects are detected from images obtained by performing image capturing of the same wall surface of the same structure at respective different times and a difference between the detected defects is obtained, so that the progress level of each individual defect is calculated. However, since an image capturing condition, such as an image capturing position or weather, varies for each image capturing, even in the case of images obtained by performing image capturing of the same wall surface of the same structure, position mismatches are included in the respective corresponding pixels of the images. Therefore, it is necessary to calculate a progress level between defects in consideration of these position mismatches. Japanese Patent Application Laid-Open No. 2019-20220 discusses a method of obtaining a correspondence relationship between defects in consideration of position mismatches.

However, in a case where the respective shapes of defects detected from images captured at different image capturing times differ greatly from each other, the above-mentioned method may be unable to detect a correspondence relationship between defects, so that an erroneous progress level may be calculated.

SUMMARY

Aspects of the present disclosure are generally directed to reducing an erroneous progress level from being calculated.

According to an aspect of the present disclosure, an information processing apparatus includes a selection unit configured to select, as a reference defect, at least one defect from among first defects associated with a first image and to select, as a correction target defect, at least one defect from among second defects associated with a second image captured at a time different from an image capturing time of the first image, a candidate generation unit configured to generate a correction candidate by modifying the correction target defect, a matching level acquisition unit configured to acquire a matching level representing a matching relationship between the reference defect and the correction candidate, a defect correction unit configured to generate a corrected defect by correcting the correction target defect based on the matching level, and a progress level acquisition unit configured to acquire a progress level representing a change in defect from the reference defect based on a comparison between the reference defect and the corrected defect.

Further features of various embodiments will become apparent from the following description of exemplary embodiments with reference to the attached drawings.

BRIEF DESCRIPTION OF THE DRAWINGS

FIGS. 3A, 3B, and 3C are diagrams used to explain a relationship between an image and defect data.

FIG. 4 is a flowchart of information processing according to a first exemplary embodiment.

FIGS. 8A, 8B, 8C, 8D, 8E, 8F, 8G, and 8H are diagrams used to explain an example of selecting a correction candidate.

FIGS. 9A, 9B, 9C, 9D, 9E, and 9F are diagrams used to explain an example of correction processing.

FIG. 10 is a diagram illustrating an example of a progress level display screen.

FIGS. 17A, 17B, 17C, 17D, and 17E are diagrams used to explain an example of calculating a determination index indicating whether to generate a correction candidate.

FIGS. 22A, 22B, 22C, 22D, 22E, 22F, 22G, and 22H are diagrams used to explain an example of calculating a matching level on a group by group basis.

DESCRIPTION OF THE EMBODIMENTS

Figure 1A:
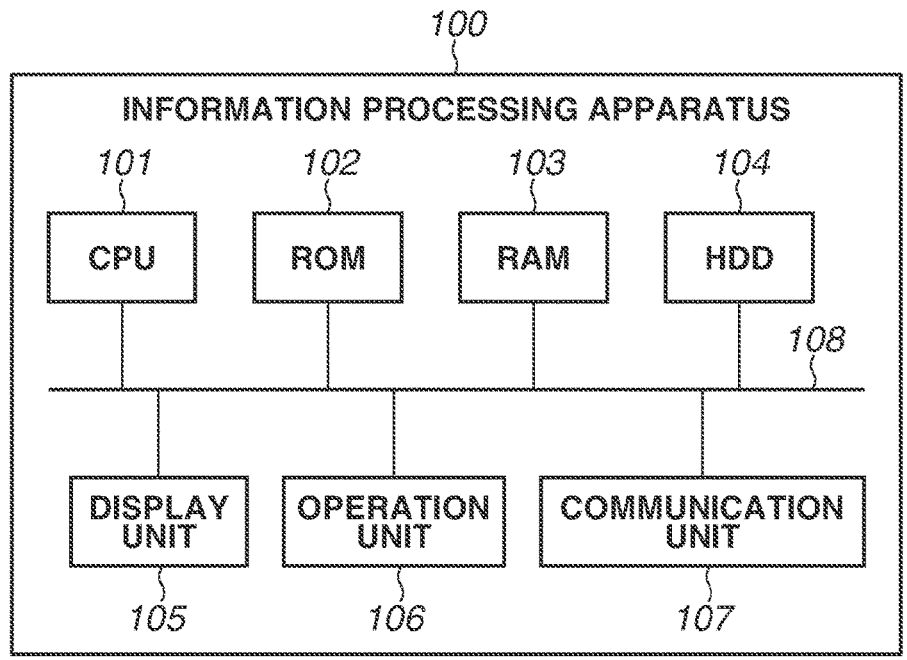
FIGS. 1A and 1B are diagrams illustrating a hardware configuration and a functional configuration of an information processing apparatus, respectively.

Various exemplary embodiments, features, and aspects of the disclosure will be described in detail below with reference to the drawings. Furthermore, configurations described in the following exemplary embodiments are merely examples, and the scope of the every embodiment should not be construed to be limited to such specific configurations.

As a first exemplary embodiment, an example of a method for calculating a progress level on changes of an inspection target using two images obtained by performing image capturing of the same inspection target at respective different times is described. Particularly, in the description of the first exemplary embodiment, a structure such as a bridge is taken as an example of an inspection target, and an information processing apparatus configured to perform what is called infrastructure inspection, such as to determine the soundness of the structure, is also taken as an example.

In the first exemplary embodiment, terms to be described in the following description are defined as follows.

In an example of the first exemplary embodiment for performing infrastructure inspection, the term "inspection target" means, for example, a concrete structure. A user to be described in the first exemplary embodiment uses an information processing apparatus according to the first exemplary embodiment with a view to inspecting, based on an image obtained by performing image capturing of an inspection target, whether there is not any defect, such as a crack, on the surface thereof. The term "defect" means, for example, in the case of a concrete structure, concrete crack, swell, flaking, efflorescence, reinforcing bar exposure, rust, water leakage, water dripping, corrosion, damage (deficiency), cold joint, precipitate, or rock pocket. The terms "first image" and "second image" mean, for example, two images obtained by performing image capturing of the same wall surface of the same structure at respective different times. In the first exemplary embodiment, the first image is assumed to mean an image captured prior to the time of image capturing of the second image. Moreover, the term "first defect data" is assumed to mean defect data obtained from the first image, and the term "second defect data" is assumed to mean defect data obtained from the second image. The term "defect data" means, for example, information about a result obtained by automatically detecting a defect, such as a crack, occurring at the concrete wall surface, or means information with a human input result recorded therein. The term "attribute information" means information representing a property (or characteristic) included in a defect, which is information including at least one of, for example, an extension, an area, a position, a width, coordinates, and a joining relationship of the defect and is included in the defect data.

Prior to the description of details of a configuration of the information processing apparatus according to the first exemplary embodiment illustrated in FIGS. 1A and 1B, an outline of information processing in the first exemplary embodiment is described with reference to FIGS. 2A, 2B, 2C, 2D, 2E, and 2F. In the following description, a concrete bridge is taken as an example of an "inspection target" for infrastructure inspection, and an example of calculating a progress level representing a secular change of cracks having occurred at the surface of the bridge is described.

Figure 2A:
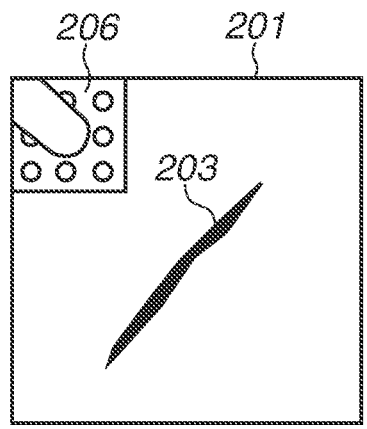
FIGS. 2A, 2B, 2C, 2D, 2E, and 2F are diagrams illustrating an outline of calculation of a progress level of defect (crack).
Figure 2B:
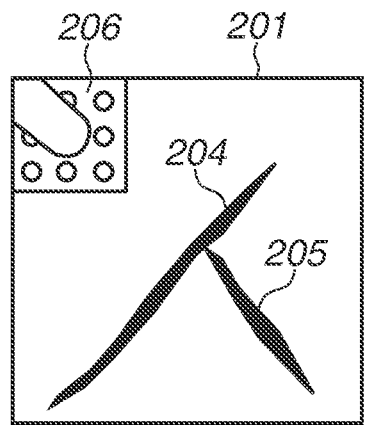

FIGS. 2A and 2B are diagrams illustrating an image 201 and an image 202 obtained by performing image capturing of the same wall surface of a bridge, which is an example of an infrastructure, at respective different times. The image 201 illustrated in FIG. 2A is an image captured several years (e.g., five years) before the image capturing time of the image 202 illustrated in FIG. 2B. While, in the description of the first exemplary embodiment, the image 201 is assumed to be a first image and the image 202 is assumed to be second image, the image 202 can be the first image and the image 201 can be the second image. On the wall surface of the infrastructure, cracks may occur by a secular change. Therefore, cracks are shown in the respective images 201 and 202. A crack 204 on the image 202 is assumed to be a result of a crack 203 on the image 201 having advanced. Furthermore, the same structure 206 of the bridge is also shown in each of the images 201 and 202.

Figure 2C:
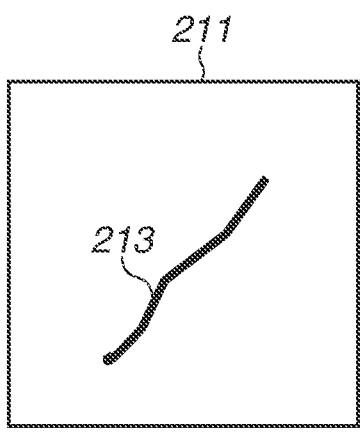
Figure 2D:
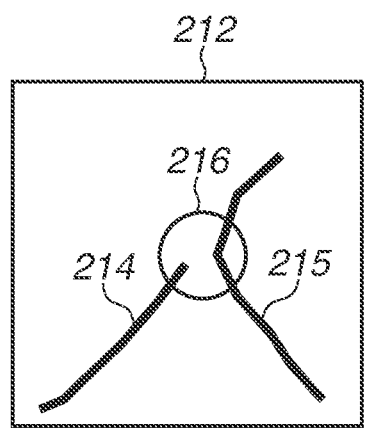

FIG. 2C is a diagram illustrating crack data 211 corresponding to the crack on the image 201, and FIG. 2D is a diagram illustrating crack data 212 corresponding to the cracks on the image 202. Crack data 213 is included in the crack data 211 illustrated in FIG. 2C, and crack data 214 and crack data 215 are included in the crack data 212 illustrated in FIG. 2D. Crack data is assumed to be data obtained by, for example, an inspection engineer inputting, for example, the position or shape of a defect, such as a crack or reinforcing bar exposure, based on a captured image and recording the input data in association with the captured image. Other methods of acquiring crack data include, for example, acquiring crack data by detecting a crack from an image with use of a trained model caused to perform learning by machine learning. In this example, the crack data 211 is assumed to be a result input by an inspection engineer, and the crack data 212 is assumed to be a result obtained by detecting cracks from a captured image with use of a model for machine learning.

To calculate a progress level on cracks by a secular change, it is necessary to compare cracks occurring at respective different times with each other and obtain a difference in, for example, crack length or crack width. Here, in many cases, position mismatches or shape mismatches caused by, for example, a difference in image capturing condition or a difference in detection condition may be included in between pieces of crack data that are based on images captured at respective different times. Therefore, to appropriately calculate a progress level on cracks, it is necessary to obtain a correspondence relationship between cracks in consideration of these mismatches or differences.

However, in a case where there is a great difference between shapes of the respective cracks, it is difficult to correctly obtain a correspondence relationship between them. For example, a comparison of the image 202 illustrated in FIG. 2B with the crack data 212 illustrated in FIG. 2D shows that branching 216 on the crack data 212 has the possibility of being wrong. In this way, in a case where branching 216 on the crack data 212 is wrong, the crack data 211 illustrated in FIG. 2C and the crack data 212 illustrated in FIG. 2D are not able to be used in combination to correctly obtain a correspondence relationship between cracks.

Figure 2E:
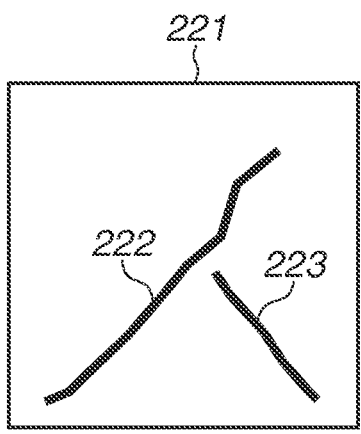
Figure 2F:
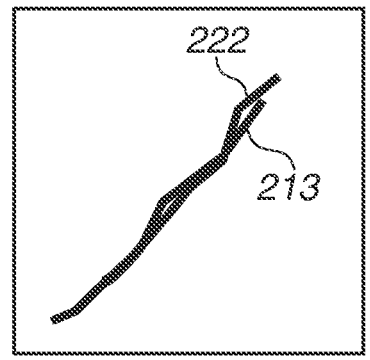

Therefore, the information processing apparatus in the first exemplary embodiment performs correction processing for crack data in such a manner that a correspondence relationship between cracks matches. The information processing apparatus in the first exemplary embodiment performs crack correction processing for correcting the branching 216 on the crack data 212 in conformity with the shape of the crack data 213. FIG. 2E is a diagram illustrating corrected crack data 221. While details of processing for correcting crack data are described below, FIG. 2E illustrates an example in which corrected crack data 222 and corrected crack data 223 have been obtained by crack correction processing. Moreover, FIG. 2F is a diagram illustrating crack data obtained by superimposing the crack data 213, which is included in the crack data 211 obtained before correction, and the crack data 222, which is included in the corrected crack data 221, on each other. The information processing apparatus then calculates, based on a comparison between the crack data 213 and the crack data 222, a progress level on cracks. For example, the information processing apparatus calculates, as a progress level on cracks, for example, a difference between respective total extensions of cracks or a difference between respective maximum crack widths.

In this way, in the first exemplary embodiment, in calculating a progress level on defects detected from images captured at respective different times, the information processing apparatus corrects the shape of one defect in such a way as to match the shape of the other defect to enable correctly obtaining a correspondence relationship between defects, thus appropriately calculating a progress level on cracks.

<Information Processing Apparatus>

FIG. 1A is a diagram illustrating a hardware configuration example of the information processing apparatus 100 according to the first exemplary embodiment. As illustrated in FIG. 1A, the information processing apparatus 100 includes a central processing unit (CPU) 101, a read-only memory (ROM) 102, a random access memory (RAM) 103, a hard disk drive (HDD) 104, a display unit 105, an operation unit 106, and a communication unit 107. The CPU 101, which is a processor, performs, for example, arithmetic operation and logical judgment for various processing operations and controls various constituent elements connected to a system bus 108. The ROM 102, which is a program memory, stores a program used for the CPU 101 to perform control, including an information processing procedure according to the first exemplary embodiment described below. The RAM 103 is used as a temporary storage region, such as a main memory or work area, for the CPU 101. Furthermore, a program memory can be implemented by loading a program onto the RAM 103 from, for example, an external storage device connected to the information processing apparatus 100.

The HDD 104 includes a hard disk recording medium for storing electronic data and a program according to the first exemplary embodiment. An external storage device can be used as a storage medium which plays a role similar to that of the HDD 104. Here, the external storage device is able to be implemented by, for example, a medium (recording medium) and an external storage drive used for implementing access to the medium. As such a medium, there are known, for example, a flexible disk (FD), a compact disc-ROM (CD-ROM), a digital versatile disc (DVD), a Universal Serial Bus (USB) memory, a magnetooptical (MO) disc, and a flash memory. Moreover, the external storage device can be, for example, a server device connected to a network.

The display unit 105 is a device which includes, for example, a cathode-ray tube (CRT) display or a liquid crystal display and outputs, for example, an image or text to a display screen thereof. Furthermore, the display unit 105 can be an external device connected to the information processing apparatus 100 by wire or by wireless. The operation unit 106 includes a keyboard and a mouse and receives various operations performed by the user. The communication unit 107 performs bidirectional communications by wire or by wireless with, for example, another information processing apparatus, a communication apparatus, or an external storage device using known communication technology.

<Functional Block Diagram>

Figure 1B:
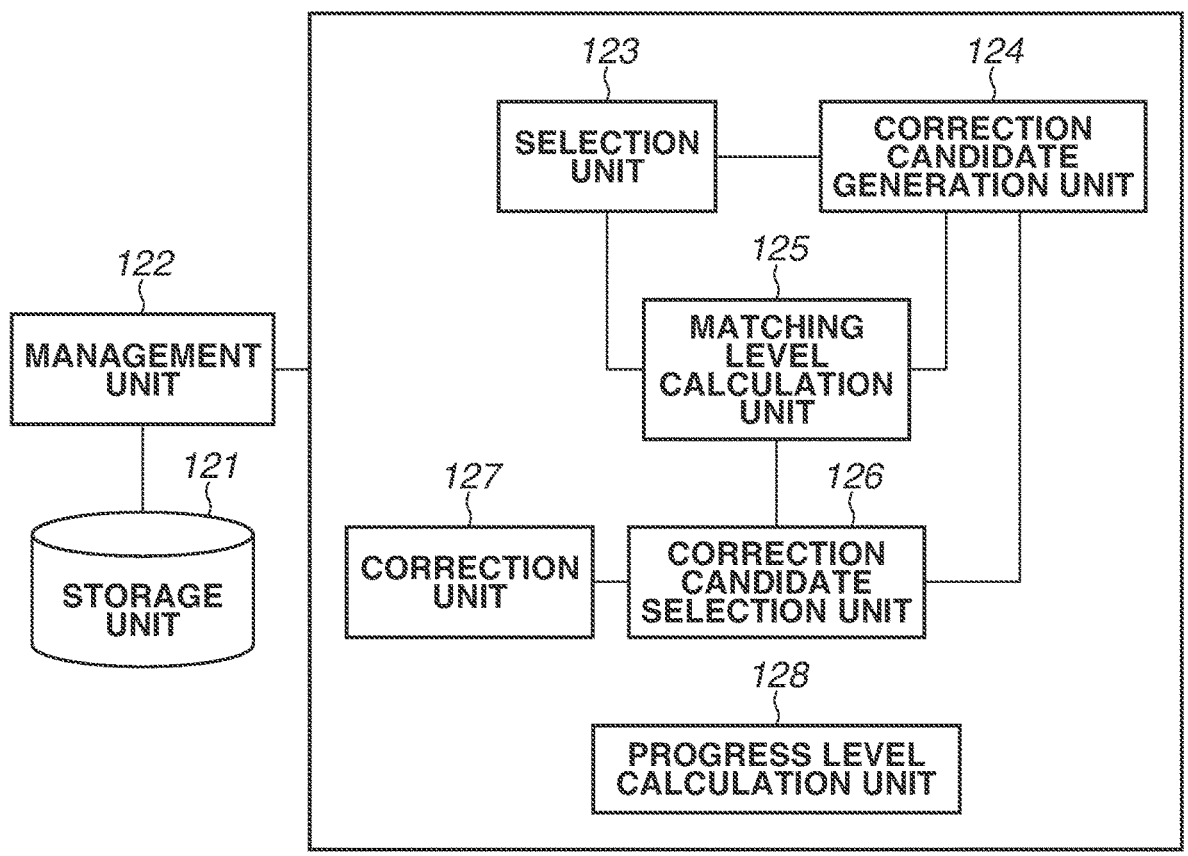

FIG. 1B is a block diagram illustrating an example of a functional configuration of the information processing apparatus 100. These functional units are implemented by the CPU 101 loading a program stored in the ROM 102 onto the RAM 103 and performing processing corresponding to the flowcharts described below. Then, results of execution of the processing operations are caused to be retained in the RAM 103. Moreover, for example, in a case where hardware is configured as a replacement for software processing using the CPU 101, arithmetic operation units and circuits corresponding to the processing operations of the respective functional units described below can be configured.

A management unit 122 manages images captured at a plurality of times, defect data corresponding to each image, and structural information about a structure, which are stored in a storage unit 121.

A selection unit 123 selects, from the first defect data, defect data used as a benchmark in correction processing described below as reference defect data, and selects, from the second defect data, defect data targeted for correction processing as correction target defect data. In the subsequent description, for the sake of simplification, the reference defect data is referred to as a "reference defect", and the correction target defect data is referred to as a "correction target defect". Thus, the selection unit 123 performs defect selection processing in such a way as to select, as a reference defect, at least one defect from among first defects associated with the first image and to select, as a correction target defect, at least one defect from among second defects associated with the second image. Details of the defect selection processing to be performed by the selection unit 123 are described below.

A correction candidate generation unit 124 and a matching level calculation unit 125 perform processing for acquiring information representing a matching relationship between the reference defect and the correction target defect. Thus, the correction candidate generation unit 124 performs processing for generating a plurality of correction candidates by modifying at least a part of attribute information about the correction target defect. Then, the matching level calculation unit 125 performs matching level acquisition processing (matching level calculation processing) for acquiring a matching level as information representing a matching relationship between the reference defect and each correction candidate. Details of the correction candidate generation processing to be performed by the correction candidate generation unit 124 and the matching level calculation processing to be performed by the matching level calculation unit 125 are described below.

A correction candidate selection unit 126 and a correction unit 127 perform defect correction processing in such a way as to generate a corrected defect by correcting the correction target defect based on information (matching level) representing the matching relationship. Thus, the correction candidate selection unit 126 performs processing for selecting one correction candidate from among a plurality of correction candidates based on a result of calculation of the matching level. Then, the correction unit 127 generates corrected defect data by correcting at least a part of attribute information about a correction target defect concerning generation of the correction candidate selected by the correction candidate selection unit 126. In the following description, the corrected defect data is referred to as a "corrected defect". Details of the correction candidate selection processing to be performed by the correction candidate selection unit 126 and the generation processing for corrected defect (correction processing) to be performed by the correction unit 127 are described below.

A progress level calculation unit 128 performs progress level acquisition processing for acquiring a progress level representing a change in defect from the reference defect based on a comparison between the reference defect and the corrected defect. For example, the progress level calculation unit 128 performs progress level calculation processing in such a way as to calculate, as a progress level, a difference between at least a part of attribute information about the reference defect and corresponding attribute information about the corrected defect. Details of the progress level calculation processing to be performed by the progress level calculation unit 128 are described below.

<Description of Relationship Between Image and Defect Data and Structural Information>

On the occasion of describing a configuration of the information processing apparatus according to the first exemplary embodiment, a relationship between an image and defect data and structural information are described.

Figure 3A:
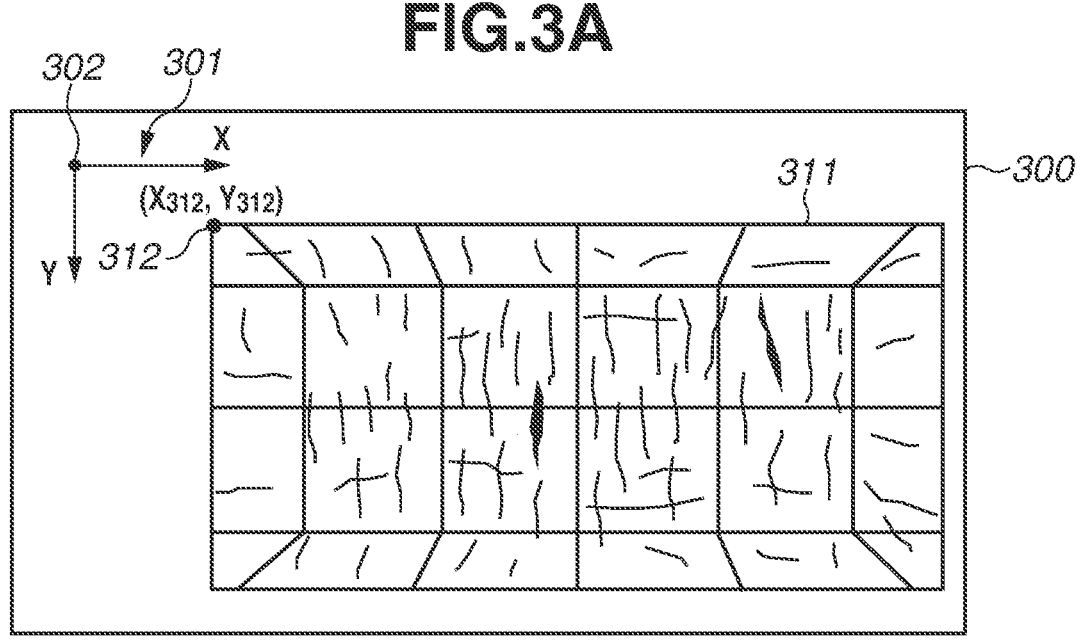

In image inspection, it is favorable to manage an image obtained by performing image capturing of a structure wall surface while associating the image with a drawing. FIG. 3A is a diagram illustrating an example in which an image 311 obtained by performing image capturing of the wall surface of a bridge, which is an example of an infrastructure, has been, while being pasted in a drawing 300, displayed on, for example, the screen of the display unit 105. Furthermore, even in the subsequent description, for example, an image and defect data on a drawing are also assumed to be the ones displayed on the display screen. The drawing 300 includes drawing coordinates 301 with a point 302 set as the origin thereof. Moreover, the position of the image 311 on the drawing 300 is defined by the vertex coordinates at the upper-left corner of the image 311. In the case of the example illustrated in FIG. 3A, the vertex coordinates of the image 311 are the position $(X_{312}, Y_{312})$ of a point 312 on the drawing 300. Furthermore, the image 311 is stored in the storage unit 121 together with its coordinate information. Moreover, an image to be used for image inspection of an infrastructure as in the first exemplary embodiment is the one captured at high resolution (e.g., 1 millimeter (mm) per pixel) to enable confirming, for example, a minute crack and is, therefore, large in size. For example, the image 311 illustrated in FIG. 3A is assumed to be an image obtained by performing image capturing of a floor slab (deck) of the bridge with a size of 20 meters (m)×10 m. In a case where the image resolution is 1.0 mm per pixel (1.0 mm/pixel), the image size of the image 311 becomes 20,000 pixels×10,000 pixels. Furthermore, while a large number of (e.g., 1,000 or more) defects, such as cracks or reinforcing bar exposures, are shown in the image 311 captured at high resolution, since it is difficult to express all of the defects on the drawing sheet, only a limited number of defects are illustrated on the drawing sheet. In the subsequent description, even in a figure illustrating a wide range of images or defect data, only a limited number of defects are assumed to be illustrated.

Defect data is, as mentioned above, information about a result obtained by automatically detecting a defect, such as a crack, occurring at the concrete wall surface, or information with a human input result recorded therein. Moreover, as mentioned above, in the first exemplary embodiment, defect data is assumed to be managed in association with a drawing.

Figure 3B:
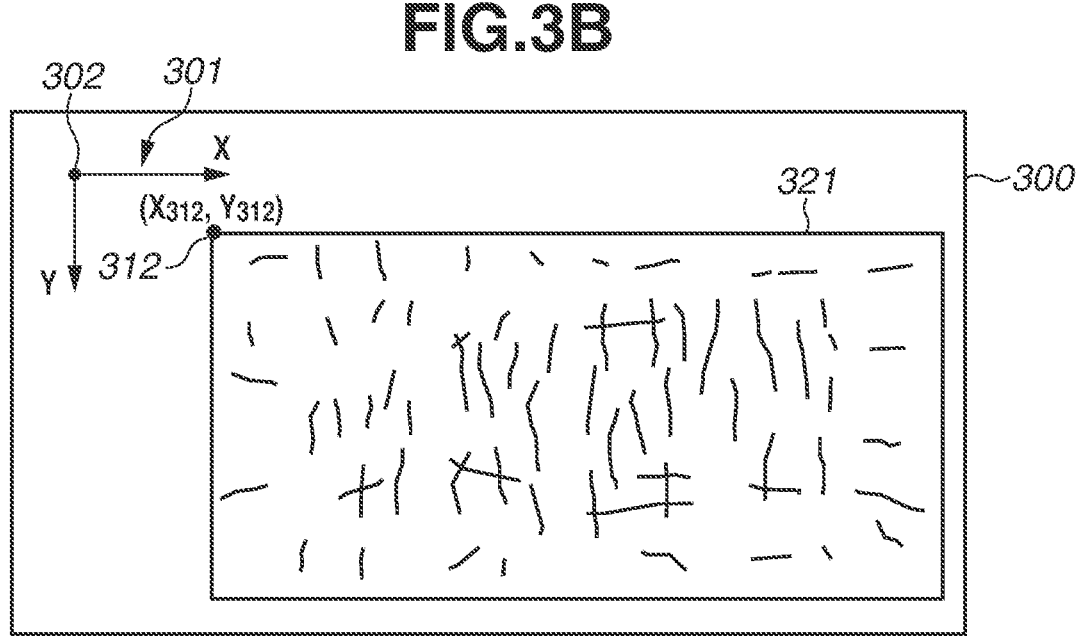

A drawing 300 illustrated in FIG. 3B shows a state in which defect data 321 corresponding to the image 311 has been pasted at the same position as that of the image 311 illustrated in FIG. 3A. The defect data 321 is assumed to include a large number of (e.g., 1,000 or more) pieces of defect data including pieces of defect data not illustrated on the drawing sheet. The position of each piece of defect data included in the defect data 321 on the drawing 300 is defined by pixel coordinates configuring each piece of defect data.

FIG. 3C is a diagram illustrating an example of a defect data table 331 representing a data structure of defect data. In the defect data table 331, the column "ID" indicates identification information about defect data, and the numerical values of, for example, the columns "coordinates", "numerical values", "maximum width", "total extension/contour length", and "area" are attribute information in defect data. The column "coordinates" indicates coordinates representing the positions of a plurality of pixels corresponding to a defect, and the column "numerical values" indicates information representing the width (with of a defect) in each coordinate position indicated by the column "coordinates". For example, defect data corresponding to the ID of crack C001 is expressed by contiguous pixels at "n" points of from coordinates $(Xc001\_1, Yc001\_1)$ to coordinates $(Xc001\_11, Yc001\_n)$. In this way, in the first exemplary embodiment, defect data is assumed to be expressed in association with pixels.

Additionally, in attribute information included in the defect data shown in the defect data table 331, the column "maximum width" indicates the maximum value of the width of a defect, the column "total extension/contour length" indicates the total extension or contour length of the length of a defect, and the column "area" indicates the area value of a defect. Moreover, at least a part of attribute information included in defect data can be expressed by vector data, such as a polyline or curve, configured with a plurality of points. In a case where attribute information included in defect data is expressed by vector data, the amount of data decreases, so that a more simplified expression is obtained. Moreover, defect data about other than cracks is also shown in the defect data table 331, and, in the example illustrated in FIG. 3C, defect data about reinforcing bar exposure indicated with the ID of "T001" is also shown. In the case of expressing reinforcing bar exposure by a polyline, the reinforcing bar exposure becomes a defect having a region surrounded by the polyline. Furthermore, attribute information included in defect data is not limited to the various pieces of attribute information shown in the defect data table 331 illustrated in FIG. 3C, but can include still other pieces of attribute information.

The structural information is information concerning a structure serving as an inspection target, and is information including specifications starting with the type or basic structure of a structure, various dimensions of a structure, member information, and year of completion. Additionally, the structural information can be set to include information concerning repair and maintenance, such as year of repair, repair portion, and repair method, as a repair track record. In the first exemplary embodiment, structural information concerning a specific position of a structure, such as member information or repair information, is assumed to be stored in the storage unit 121 together with position information on the drawing. Thus, the position of each member on the drawing or the position of each repair on the drawing is stored as a part of structural information. Accordingly, it is possible to obtain a correspondence relationship between structural information and an image and defect data via the drawing. Structural information is stored in the storage unit 121 together with image data or defect data, and is able to be acquired by the management unit 122. Furthermore, information included in the structural information is not limited to the above-mentioned pieces of information, but can include still other pieces of information. Moreover, the structural information can include information confined for each type of defect according to the type of a structure.

<Flowchart>

FIG. 4 is a flowchart illustrating the main flow of information processing which is performed by the information processing apparatus 100 in the first exemplary embodiment.

As mentioned above, in the first exemplary embodiment, to calculate a progress level on defects occurring at the wall surface of a structure, two images (e.g., a first image and a second image), captured at respective different times, are used. The first image and the second image are images obtained by performing image capturing of the same wall surface of the same structure, and show defects having occurred at the wall surface. In the first exemplary embodiment, the first image is assumed to be an image captured prior to (e.g., five years before) the second image. Moreover, as mentioned above, data obtained by detecting a defect from the first image is referred to as "first defect data", and data obtained by detecting a defect from the second image is referred to as "second defect data". The information processing apparatus 100 in the first exemplary embodiment starts processing illustrated in the flowchart of FIG. 4 in response to receiving an input for starting the processing from the operation unit 106. Then, when calculation processing for a progress level has been completed as described below, the information processing apparatus 100 displays, on the display unit 105, display data indicating a progress level calculation result and, then, ends the processing in the flowchart of FIG. 4. In the following description, information processing which is performed by the information processing apparatus 100 in the first exemplary embodiment is described with reference to the flowchart of FIG. 4.

<Selection of Defect>

In step S401, the selection unit 123 selects, as a reference defect, defect data serving as a benchmark for correcting a defect from among the first defect data, and selects, as a correction target defect, defect data targeted for correction processing from among the second defect data. In the first exemplary embodiment, as an example of explaining a selection method for the reference defect and the correction target defect, a method of selecting, as the reference defect, one piece of defect data from among the first defect data and selecting the correction target defect based on coordinate information about the reference defect from among the second defect data is described.

Figure 5A:
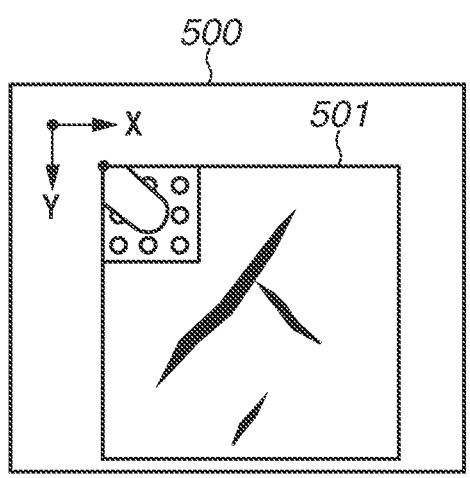
FIGS. 5A, 5B, 5C, and 5D are diagrams used to explain an example of selecting a reference defect and a correction target defect.
Figure 5B:
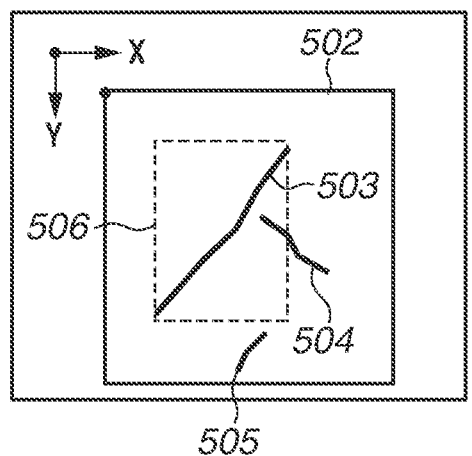
Figure 5C:
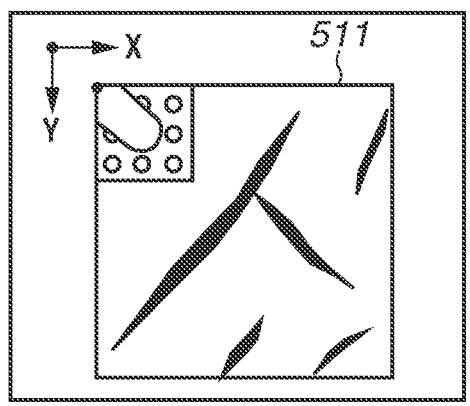
Figure 5D:
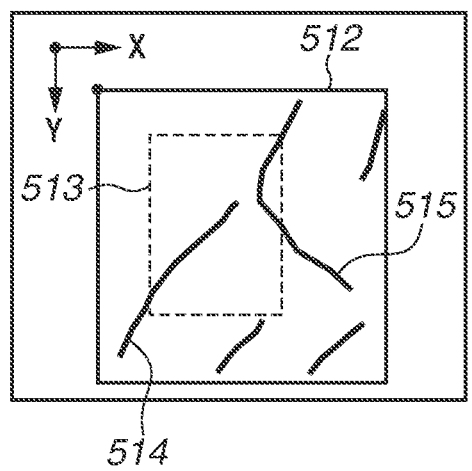

FIG. 5A is a diagram illustrating a first image 501, and FIG. 5B is a diagram illustrating first defect data 502. The first image 501 is an image obtained by performing image capturing of the wall surface of a bridge, and the first defect data 502 is crack data corresponding to the first image 501. FIG. 5C is a diagram illustrating a second image 511, and FIG. 5D is a diagram illustrating second defect data 512. The second image 511 is an image obtained by performing image capturing of the same wall surface of the bridge at a time different from (e.g., five years after) the image capturing time of the first image 501, and the second defect data 512 is crack data corresponding to the second image 511. The images 501 and 511 and the pieces of defect data 502 and 512 are pasted at the same position on a drawing 500.

First, the selection unit 123 selects, as a reference defect, one piece of defect data from among the first defect data. As one of methods of selecting a reference defect, there is a method of selecting a reference defect based on coordinate information on a drawing. For example, in the case of selecting, as a reference defect, defect data located at the most upper left on the drawing, the selection unit 123 selects, as a reference defect 503, defect data 503 from among the first defect data 502. Moreover, as another method of selecting a reference defect, the selection unit 123 can select a reference defect based on attribute information. For example, in a case where the defect is a crack, the selection unit 123 can select defect data in which the total extension of a crack is the largest, or can select defect data in which the maximum width of a crack is the largest. Additionally, as another method of selecting a reference defect, the selection unit 123 can select, as a reference defect, defect data located closest to a structurally important region of the structure, or can select a reference defect based on an operation designated by the user.

Next, the selection unit 123 selects a correction target defect from among the second defect data. As a method of selecting a correction target defect, there is a method of selecting, as a correction target defect, defect data located near the reference defect. For example, in the case of a correction target defect corresponding to the reference defect 503 illustrated in FIG. 5B, first, the selection unit 123 obtains a rectangular range 506 surrounding the reference defect 503. Next, the selection unit 123 superimposes the rectangular range 506 on the second defect data 512, thus obtaining a rectangular range 513. Then, the selection unit 123 selects, as a correction target defect corresponding to the reference defect 503, defect data at least a part of which is located within the rectangular range 513 from among the second defect data 512.

At this time, a part of the second defect data may be divided near the boundary of the rectangular range 513, in other words, a part of defect data may become outside the rectangular range 513. For example, each of the defect data 514 and defect data 515 illustrated in FIG. 5D is divided near the boundary of the rectangular range 513 (a part thereof is outside the rectangular range 513). If a part of the defect data divided in this way is selected as a correction target defect, in other words, only a portion located within the rectangular range 513 is selected as a correction target defect, correction candidate generation processing in step S402 described below may become complex. Therefore, the selection unit 123 directly selects, as a correction target defect, each of the defect data 514 and defect data 515, at least a part of which is included in the rectangular range 513. Alternatively, the selection unit 123 can expand the rectangular range 513 in the X-axis and Y-axis directions in such a way as to prevent defect data from being divided, in other words, in such a way as to prevent any part of defect data from becoming outside the expanded rectangular range.

While, in the above description, as a method of selecting a reference defect, a method of selecting one piece of defect data as a reference defect has been described, the selection unit 123 can be configured to collectively select a plurality of pieces of defect data as a reference defect. As a method of collectively selecting a plurality of pieces of defect data as a reference defect, there is a method of selecting a plurality of pieces of defect data based on attribute information about defect data. For example, out of the first defect data 502 illustrated in FIG. 5B, the selection unit 123 collectively selects defect data 503 and defect data 504, which are close to each other in distance between centroids of areas of defects, as one reference defect. Such a method of obtaining a correction target defect corresponding to a reference defect including a plurality of pieces of defect data can include a method similar to the above-mentioned method. Thus, the selection unit 123 performs processing for obtaining a rectangular range surrounding all of the pieces of defect data collectively selected as a reference defect and then superimposing the obtained rectangular range on the second defect data.

Then, the selection unit 123 selects defect data included in the rectangular range on the second defect data as a correction target defect corresponding to the reference defect obtained by collective selection.

<Generation of Correction Candidate>

In step S402, the correction candidate generation unit 124 generates a correction candidate by modifying attribute information about the correction target defect. A method of generating a correction candidate in the first exemplary embodiment is described with reference to FIGS. 6A, 6B, 6C, 6D, 6E, 6F, 6G, 6H, and 6I.

Figure 6A:
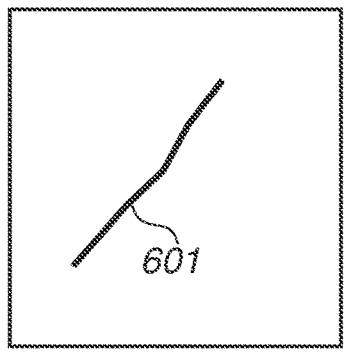
FIGS. 6A, 6B, 6C, 6D, 6E, 6F, 6G, 6H, and 6I are diagrams used to explain an example of generating correction candidates for defect.
Figure 6B:
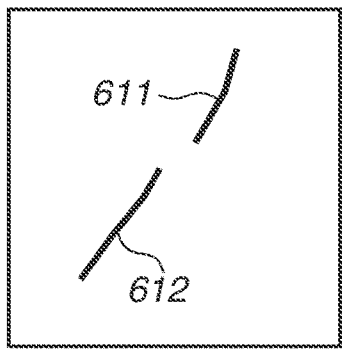
Figure 6C:
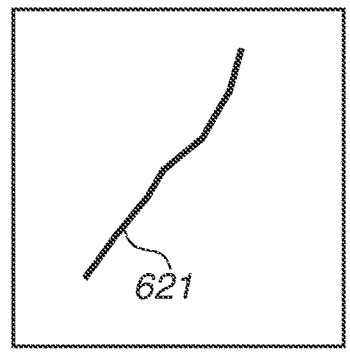
Figure 6D:
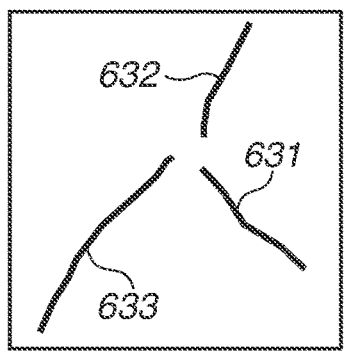
Figure 6E:
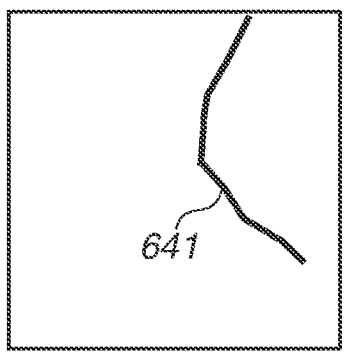

FIG. 6A is a diagram illustrating a reference defect 601, and FIG. 6B is a diagram illustrating two correction target defects 611 and 612 corresponding to the reference defect 601. As a method of generating a correction candidate from a correction target defect, there is a method of joining respective parts of correction target defects, for example, joining respective end points thereof, and setting defect data obtained by such joining processing as a correction candidate. As a specific example, the correction candidate generation unit 124 joins respective end points close to each other of the correction target defects 611 and 612, thus generating a correction candidate 621, such as that illustrated in FIG. 6C. In a case where there are three or more correction target defects, the correction candidate generation unit 124 selects and joins two optional correction target defects, thus generating a plurality of correction candidates. For example, in a case where there are three correction target defects 631, 632, and 633 illustrated in FIG. 6D, the correction candidate generation unit 124 selects and joins the correction target defects 631 and 632, thus obtaining a correction candidate 641 illustrated in FIG. 6E. In this way, the correction candidate generation unit 124 repeats an operation of selecting and joining two different correction target defects, thus being able to generate a plurality of correction candidates differing in branching shape.

Moreover, as another method of generating a correction candidate, there is a method of performing processing for cutting off a part of a correction target defect and setting defect data obtained by such cutting processing as a correction candidate. Additionally, as another method of generating a correction candidate, there is also a method of using the cutting processing and joining processing for correction target defects in combination with each other, thus generating a correction candidate having a branching relationship different from branching of the defect (correction target defect) obtained before cutting.

Figure 6F:
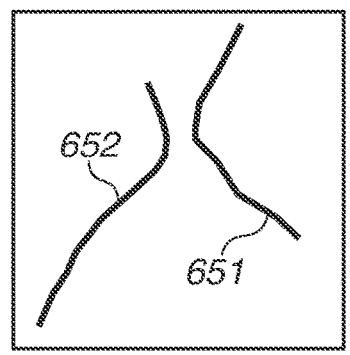
Figure 6G:
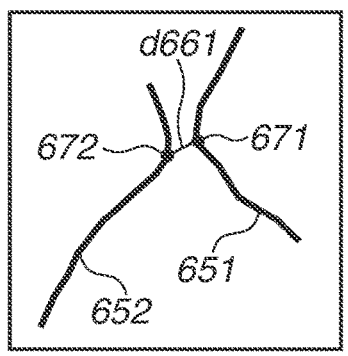
Figure 6H:
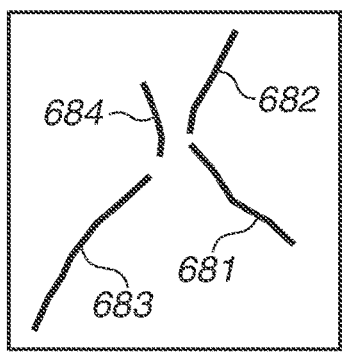

Here, an example of generating, from two correction target defects 651 and 652 illustrated in FIG. 6F, a correction candidate differing in branching, in other words, a correction candidate having a joining relationship different from a joining relationship between correction target defects, is described. First, the correction candidate generation unit 124 cuts each of the correction target defects 651 and 652 at a respective optional coordinate position. The method of determining the cutting position includes, for example, a method of obtaining the shortest distance between two correction target defects and setting coordinates of both ends of the shortest distance as the respective cutting positions. The method of obtaining the shortest distance between defects can be an optional method, and includes, for example, a method of calculating Euclidean distances between pixels of the respective defects and obtaining the minimum value of the Euclidean distances as the shortest distance. FIG. 6G is a diagram illustrating the shortest distance d661 between the correction target defects 651 and 652. The correction candidate generation unit 124 cuts the correction target defects 651 and 652 with coordinates 671 and 672 at both ends of the shortest distance d661 set as the respective cutting positions. Thus, the correction candidate generation unit 124 cuts the correction target defect 651 at the coordinates 671, and cuts the correction target defect 652 at the coordinates 672. FIG. 6H is a diagram illustrating defect data 681 and defect data 682, which have been obtained as a result of cutting the correction target defect 651, and defect data 683 and defect data 684, which have been obtained as a result of cutting the correction target defect 652.

Figure 6I:
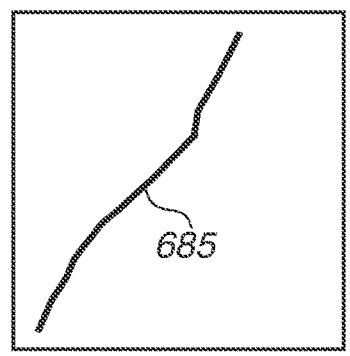

Next, the correction candidate generation unit 124 selects two pieces of defect data from among the pieces of defect data 681, 682, 683, and 684 obtained by cutting illustrated in FIG. 6H, and then joins end points thereof close to each other in coordinates. At this time, the correction candidate generation unit 124 joins pieces of defect data in such a way as to bring about a branching shape different from the shape obtained before cutting (FIG. 6F). FIG. 6I is a diagram illustrating a correction candidate 685, which has been obtained by selecting the defect data 682 and the defect data 683, obtained as a result of cutting, and joining the end point coordinates of the selected pieces of defect data.

In this way, the correction candidate generation unit 124 cuts parts of correction target defects and performs joining, thus being able to generate a correction candidate having a branching different from the branching of each correction target defect. Furthermore, while FIG. 6I illustrates one correction candidate as an example, the correction candidate generation unit 124 is also able to generate a plurality of correction candidates, such as a correction candidate obtained by joining the defect data 683 and the defect data 681 obtained as a result of cutting illustrated in FIG. 6H or a correction candidate obtained by joining the defect data 684 and the defect data 682 obtained as a result of cutting illustrated in FIG. 6H.

As another method of determining the cutting position of a correction target defect, the cutting position can be designated by the user. In this case, the information processing apparatus 100 causes the display unit 105 to display correction target defects and a wall surface image side by side and thus allows the user to designate the cutting coordinates. Then, the correction candidate generation unit 124 cuts the correction target defects based on the coordinates designated by the user and joins defects obtained by cutting, thus being able to generate a correction candidate.

As another method of generating a correction candidate by modifying attribute information about a correction target defect, a method of moving the coordinate position of a correction target defect can also be used. For example, the correction candidate generation unit 124 moves the position of a correction target defect in at least one of the X-axis direction and Y-axis direction, thus being able to generate a correction candidate obtained in consideration of a position mismatch between the reference defect and the correction target defect. The method of moving the position of a correction target defect in the X-axis direction includes, for example, a method of obtaining the total length in the X-axis direction of a correction target defect and moving the correction target defect by a distance corresponding to a part (e.g., 10%) of the obtained total length in the plus or minus X-axis direction. The method of moving the position of a correction target defect in the Y-axis direction include a similar method. Moreover, the correction candidate generation unit 124 can generate a correction candidate by simultaneously changing shape information and position information about a correction target defect. Thus, after joining respective end points of correction target defects, the correction candidate generation unit 124 then moves the coordinate positions in the X-axis direction and/or Y-axis direction in a way similar to that mentioned above. This enables generating a variety of correction candidates.

Moreover, a correction target defect often includes a defect in which a matching relationship with a reference defect is originally high and it is not necessary to perform correction processing. If correction processing is performed on a correction target defect in which a matching relationship with a reference defect is high, an appropriate progress level may not be able to be obtained. Therefore, the correction candidate generation unit 124 sets a correction target defect itself as one of correction candidates. Then, in processing in step S403 and subsequent steps described below, the correction candidate generation unit 124 compares the matching relationship with matching relationships with other correction candidates, and, if it is determined that the correction candidate for the correction target defect itself has the highest matching relationship, the correction candidate generation unit 124 is able to skip correction processing. In this way, setting a correction target defect itself as one of correction candidates is a suitable method.

<Calculation of Matching Level>

In step S403, the matching level calculation unit 125 performs processing for calculating a matching level representing a matching relationship between the reference defect and the correction candidate. As a method of calculating the matching level, there is a method of expanding the shapes of respective defects and calculating, as a matching level, a degree of overlap between the expanded defects. An example of processing for calculating the matching level is described with reference to FIGS. 7A, 7B, 7C, 7D, 7E, 7F, and 7G.

Figure 7A:
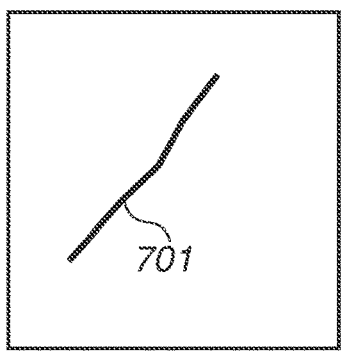
FIGS. 7A, 7B, 7C, 7D, 7E, 7F, and 7G are diagrams used to explain an example of calculating a matching level.
Figure 7B:
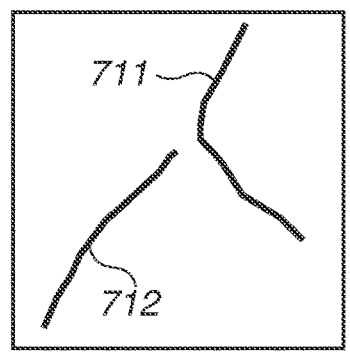
Figure 7C:
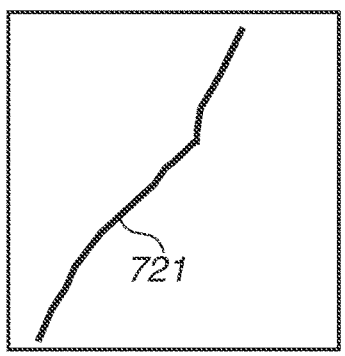
Figure 7D:
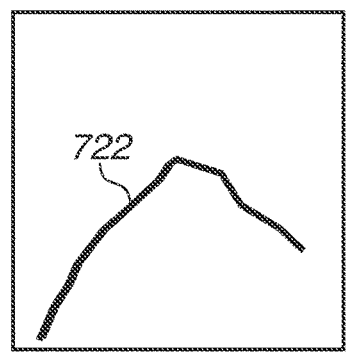
Figure 7E:
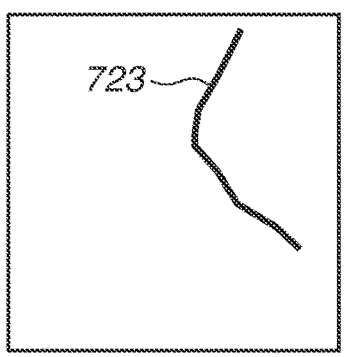
Figure 7F:
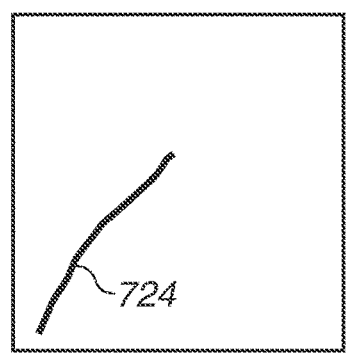

FIG. 7A is a diagram illustrating a reference defect 701 selected from the first defect data. FIG. 7B is a diagram illustrating correction target defects 711 and 712, which correspond to the reference defect 701, included in the second defect data. FIGS. 7C to 7F are diagrams illustrating examples of correction candidates 721 to 724 generated from the correction target defects 711 and 712 by the correction candidate generation unit 124. Furthermore, the correction candidate 723 illustrated in FIG. 7E is a correction candidate for the correction target defect 711 itself, and the correction candidate 724 illustrated in FIG. 7F is a correction candidate for the correction target defect 712 itself.

In calculating a matching level, the matching level calculation unit 125 selects one correction candidate from among the correction candidates 721 to 724. First, the matching level calculation unit 125 selects the correction candidate 721.

Figure 7G:
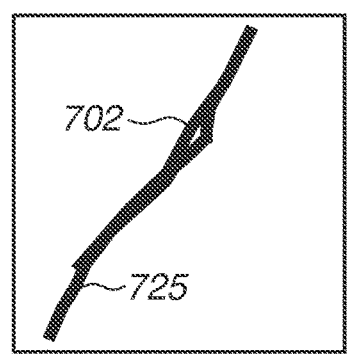

Next, the matching level calculation unit 125 performs processing for overlapping the respective shapes of the correction candidate 721 and the reference defect 701. Here, to take into consideration a position mismatch or shape mismatch included in between the first defect data and the second defect data, the matching level calculation unit 125 expands the shapes of the respective pieces of defect data and then performs overlapping. FIG. 7G is a diagram illustrating a state in which a reference defect 702 obtained by expanding the reference defect 710 and a correction candidate 725 obtained by expanding the correction candidate 721 have been overlapped each other.

Then, the matching level calculation unit 125 calculates, as a matching level C, a degree of overlap between the reference defect 702 obtained by expansion and the correction candidate 725 obtained by expansion. The following formula (1) is used to calculate the matching level C.

$$C = \frac{P_1 \wedge P_2}{P_1 \vee P_2} \quad (1)$$

Here, in formula (1), parameter $P_1$ denotes the area of the reference defect 702 obtained by expansion, and parameter $P_2$ denotes the area of the correction candidate 725 obtained by expansion. According to formula (1), if the defects coincide with each other, the matching level C becomes "1", and, if the defects do not overlap each other at all, the matching level C becomes "0". Thus, in the case of calculating the degree of overlap between defects as a matching level, the matching level C ranges from "0" to "1".

After obtaining one matching level, the matching level calculation unit 125 selects a different correction candidate while keeping the reference defect selected, and then similarly calculates a matching level using formula (1). The matching level calculation unit 125 repeats such matching level calculation processing with respect to respective correction candidates, thus being able to calculate matching levels between the reference defect and all of the correction candidates.

Moreover, as another method of calculating a matching level, the matching level calculation unit 125 can calculate a matching level with use of a feature quantity calculated from defect data (attribute information about a correction candidate). The following formulae (2) and (3) are used to calculate a matching level C using area centroid coordinates of a defect as an example of the feature quantity.

$$C = \frac{1}{\sqrt{(P_{1x} - P_{2x})^2 + (P_{1y} - P_{2y})^2}} \quad (P_{1x} \neq P_{2x} \text{ or } P_{1y} \neq P_{2y}) \quad (2)$$

$$C = C_C \quad (P_{1x} = P_{2x} \text{ and } P_{1y} = P_{2y}) \quad (3)$$

Here, in formulae (2) and (3), parameters $P_{1x}$ and $P_{1y}$ denote the area centroid coordinates ($P_{1x}$, $P_{1y}$) of the reference defect, and parameters $P_{2x}$ and $P_{2y}$ denote the area centroid coordinates ($P_{2x}$, $P_{2y}$) of the selected correction candidate. Parameter $C_C$ is a fixed value in a case where the area centroid coordinates of the respective defects coincide with each other, and is an optional constant larger than "1". According to formula (2), as the distance between area centroids of the respective defects is larger, the matching level C becomes a smaller value. On the other hand, in a case where the area centroids of the respective defects coincide with each other, the matching level C becomes the constant $C_C$, which is the largest value.

<Selection of Correction Candidate>

In step S404, the correction candidate selection unit 126 performs processing for selecting a correction candidate based on a result of calculation of a matching level. An example of processing for selecting a correction candidate using a matching level is described with reference to FIGS. 8A, 8B, 8C, 8D, 8E, 8F, 8G, and 8H. Here, a matching level which is used in the first exemplary embodiment is assumed to be calculated as the degree of overlap between defects (overlap degree) as mentioned above. Accordingly, the matching level ranges from "0" to "1", and shows that, as the matching level is a value closer to "1", the matching relationship between defects is higher.

FIG. 8A is a diagram illustrating a reference defect 801, and FIG. 8B is a diagram illustrating a correction target defect 802. Moreover, FIGS. 8C to 8F are diagrams illustrating correction candidates 803, 804, 805, and 806 generated from the correction target defect 802. Furthermore, defect identifiers (IDs) CR101, CR102, CR103, and CR104 for identifying the respective defects of correction candidates are also assigned near the respective defects of correction candidates 803, 804, 805, and 806. Additionally, the correction candidate 806 illustrated in FIG. 8F is an example of a correction candidate obtained from a part of the correction target defect 802 itself illustrated in FIG. 8B.

Then, FIG. 8G is a diagram illustrating a matching level list 811 showing results of calculating matching levels between the respective defects of correction candidates 803, 804, 805, and 806 and the reference defect 801. Here, as a method of selecting a correction candidate based on a matching level, there is a method of selecting a correction candidate in which the matching level is the largest out of a plurality of matching levels. For example, in the case of the matching level list 811, the correction candidate selection unit 126 selects the correction candidate 803, which corresponds to a defect having the largest matching level (defect ID: CR101). In a case where, as in the matching level list 811, there is only one defect having the largest value of matching level, the correction candidate selection unit 126 is able to uniquely select a correction candidate using a matching level.

FIG. 8H is a diagram illustrating an example of another matching level list 812 in which defect IDs CR201 to CR204 are assigned, and both the matching levels of the defect IDs CR203 and CR204 are "0.75", which is the largest value of matching level. In a case where, as illustrated in FIG. 8H, there is a plurality of defects the matching level of which is the largest, the correction candidate selection unit 126 is not able to uniquely select a correction candidate. In this case, it is desirable that the information processing apparatus 100 generate display images indicating a plurality of correction candidates having the largest matching level and a reference defect, cause the display unit 105 to display the generated display images, and allow the user to determine a correction candidate. Then, in a case where the user has determined a desired correction candidate via the display images, the correction candidate selection unit 126 selects the correction candidate determined by the user.

Furthermore, in the matching level calculation result, in a case where the largest value of matching level is a value close to "0" (e.g., "0.1"), a correction candidate selected based on the matching level has a high probability of being inappropriate. Therefore, when the largest value of matching level is less than a predetermined threshold value (referred to as a "matching level reference value"), the information processing apparatus 100 generates display images indicating the largest value of matching level, a reference defect, and correction candidates and causes the display unit 105 to display the display images. Furthermore, the matching level reference value includes, for example, "0.2". Then, it is desirable that the information processing apparatus 100 allow the user to check and determine a correction candidate based on the display images. In a case where, as a result of the user performing checking via the display images, any correction candidate has not been designated (or selection of a correction candidate has been canceled), the correction candidate selection unit 126 ends processing in step S404 without selecting any correction candidate, and then advances the processing to step S407.

<Correction Processing for Defect>

In step S405, the correction unit 127 performs processing for correcting a correction target defect based on a result of selection of a correction candidate. A method of correcting a correction target defect in the first exemplary embodiment is described with reference to FIGS. 9A, 9B, 9C, 9D, 9E, and 9F.

Figure 9A:
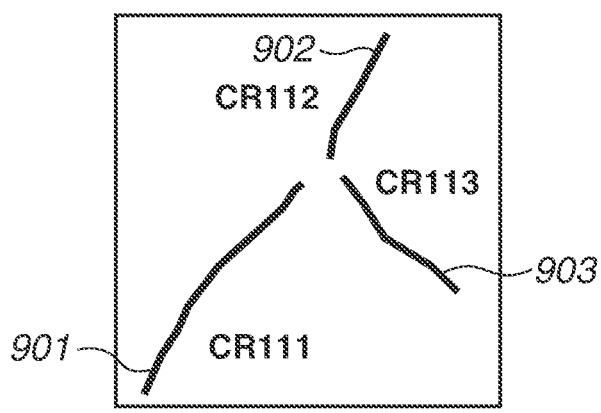
Figure 9B:
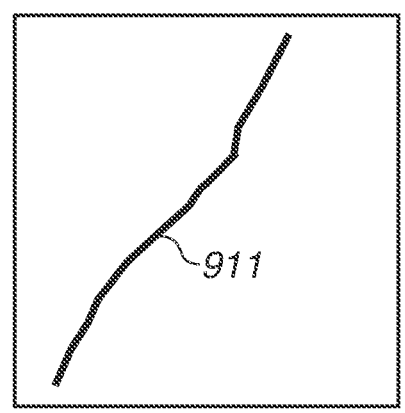

FIG. 9A is a diagram illustrating correction target defects 901, 902, and 903, and defect IDs CR111, CR112, and CR113 are also assigned near the respective correction target defects 901, 902, and 903. FIG. 9B is a diagram illustrating an example of a correction candidate 911 obtained by the correction candidate selection unit 126 modifying and selecting a correction target defect. The correction candidate 911 is a correction candidate generated by joining two correction target defects 901 and 902.

Figure 9C:
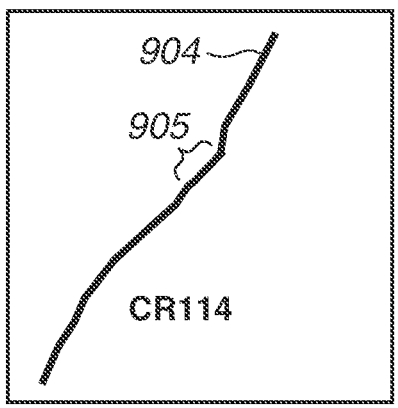

In correcting a correction target defect, first, the correction unit 127 changes the shape of the correction target defect in conformity with the shape of a correction candidate. In the case of the example illustrated in FIG. 9A, the correction unit 127 performs correction processing for joining the correction target defects 901 and 902 in such a manner that the shapes of the correction target defects 901 and 902 coincide with the shape of the correction candidate 911. FIG. 9C is a diagram illustrating a corrected defect 904 obtained by changing the shapes of the correction target defects 901 and 902 by the correction processing for joining the correction target defects 901 and 902. The corrected defect 904 is generated by correction processing for adding a partial defect 905 near the middle position as a new defect and then joining the correction target defects 901 and 902 to each other.

Next, the correction unit 127 obtains attribute information about pixels of the added partial defect. Here, as a method of obtaining attribute information about the partial defect, there is a method of performing interpolation using attribute information corresponding to nearby pixels. Specifically, assuming that attribute information varies linearly or non-linearly from one end point position of the partial defect to the other end point position thereof, the correction unit 127 performs approximate interpolation on attribute information about pixels of the partial defect with use of attribute information about two end points. This enables obtaining attribute information in pixels of the partial defect.

Figure 9D:
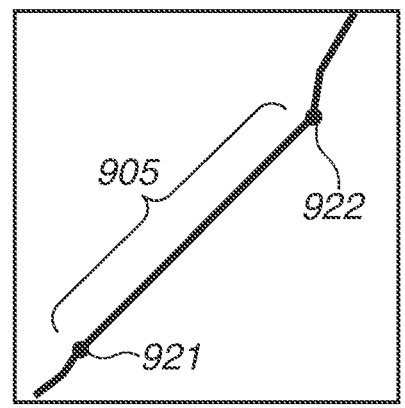

A method of obtaining a defect width of pixels of the partial defect 905 is described as an example. FIG. 9D is a diagram illustrating the vicinity of the partial defect 905 in an enlarged manner. Moreover, suppose that the defect widths of coordinates 921 and 922 at both ends of the partial defect 905 are 1.0 mm and 2.0 mm, respectively. At this time, the correction unit 127 approximates the defect width of pixels of the partial defect 905 by a value ranging from 1.0 mm to 2.0 mm in conformity with pixel positions. Attribute information about other than the defect width is also able to be obtained in a similar way. Furthermore, single attribute information for every defect, such as the maximum width or the area, can be recalculated for every defect and then updated.

FIGS. 9E and 9F are diagrams illustrating examples of defect data tables obtained before and after updating associated with correction processing. In the defect data table 931 illustrated in FIG. 9E, three pieces of defect data concerning defects obtained before correction, in this example, respective pieces of defect data about the correction target defects 901, 902, and 903 illustrated in FIG. 9A, are stored. In the defect data table 932 illustrated in FIG. 9F, defect data obtained after correction is stored. In the defect data table 932, in comparison with the defect data table 931, defects of the defect IDs "CR111" and "CR112" are deleted and a new defect of the defect ID "CR114" is added. In this way, the correction unit 127 performs update processing, i.e., for example, addition, deletion, and modification, for the defect data tables in conjunction with correction processing.

While, in the first exemplary embodiment, an example in which new defect data obtained after correction in association with correction processing is added has been described, the correction unit 127 can be configured to update defect data targeted for correction. Thus, the correction unit 127 can be configured not to add defect data of the defect ID "CR114" but to update any one of pieces of defect data of the defect IDs "CR111" and "CR112" and delete the other piece of defect data. Moreover, the correction unit 127 can be configured to store, in the defect data table, an implementation track record of correction processing, such as the date of implementation of correction processing, correction source defect ID, correction processing portion coordinates and numerical values for every coordinate, pre-correction processing maximum width, pre-correction processing total extension/contour length, and pre-correction processing area. Storing an implementation track record of correction processing in the defect data table enables, for example, retrieving correction-processed data or displaying, on the display unit 105, attribute information obtained before and after correction processing concerning the corrected defect.

Furthermore, in a case where the correction candidate selection unit 126 has selected a correction candidate for the correction target defect itself, changing the shape of a correction target defect or attribute information in step S405 becomes unnecessary.

<Calculation of Progress Level>

In step S406, the progress level calculation unit 128 calculates, with use of the reference defect and the corrected defect, a progress level with respect to the reference defect. In the first exemplary embodiment, the progress level calculation unit 128 performs processing for obtaining a difference between pieces of attribute information about the respective pieces of defect data as a progress level. For example, in a case where the defect type is a crack, the progress level calculation unit 128 calculates a difference in maximum width and total extension. Here, the maximum width and total extension of each crack are stored, as attribute information, in the storage unit 121. Accordingly, the progress level calculation unit 128 acquires the respective maximum widths and total extensions of the reference defect and the corrected defect and obtains a difference in maximum with and a difference in total extension between the reference defect and the corrected defect, thus being able to calculate a progress level with respect to the reference defect. In a case where the defect type is other than cracks, the progress level calculation unit 128 is also able to calculate a progress level in a similar way. For example, in a case where the defect type is reinforcing bar exposure, the progress level calculation unit 128 is able to use a difference in area as a progress level. The area of each piece of defect data is previously stored, as attribute information, in the storage unit 121. Accordingly, the progress level calculation unit 128 acquires the respective areas of the reference defect and the corrected defect associated with the reference defect and obtains a difference in area between the reference defect and the corrected defect, thus being able to calculate a progress level.

<Determination of Completion of Progress Level Calculation Processing>

In step S407, the progress level calculation unit 128 performs processing for determining whether the progress level calculation processing has been completed. As a method of determining completion of the progress level calculation processing, there is a method of performing checking based on whether all of the pieces of defect data included in the first defect data have been selected as the reference defect. if, as a result of the checking, there is defect data not yet selected (NO in step S407), the information processing apparatus 100 advances the processing to step S409, in which the selection unit 123 selects a next reference defect and a next correction target defect, so that the correction candidate generation in step S402 and subsequent processing operations are repeated. On the other hand, if, as a result of the checking, all of the pieces of defect data included in the first defect data have been selected as reference defects (YES in step S407), the information processing apparatus 100 advances the processing to step S408.

Here, there is a case where the user may want to limit pieces of defect data from which to calculate a progress level out of the first defect data. In that case, the user can previously limit pieces of defect data targeted for progress level calculation with use of information, such as attribute information, about defect data or a region range thereof on an image. Moreover, in that case, in determination processing in step S407, the progress level calculation unit 128 checks whether all of the limited pieces of defect data have been selected as reference defects. This enables performing progress level calculation processing only on the limited pieces of defect data. Furthermore, the information processing apparatus 100 can be configured to allow the user to designate determination of the completion of progress level calculation processing each time. In this case, the information processing apparatus 100 generates display data for requesting the user to determine the completion of progress level calculation processing and causes the display unit 105 to display the generated display data. Then, the progress level calculation unit 128 determines whether to complete progress level calculation processing based on a designation made by the user.

<Displaying of Progress Level>

In step S408, the information processing apparatus 100 performs processing for generating display data for displaying the progress level calculation result and causing the display unit 105 to display the generated display data.

FIG. 10 is a diagram illustrating an example of a progress level display screen for displaying the progress level calculation result. As illustrated in FIG. 10, the information processing apparatus 100 generates display data for displaying a reference defect 1001 and a corrected defect 1011 as well as a progress level 1021 in a window 1000 and causes the display unit 105 to display the generated display data. Furthermore, the defect type of defect data used here is assumed to be a crack. Therefore, in the progress level 1021, as an example of a progress level, the amounts of change of the maximum width and total extension of the crack are shown. In the corrected defect 1011, a partial defect 1012 shown in dashed line represents a portion corrected by correction processing. Displaying a corrected defect and a reference defect side by side as illustrated in FIG. 10 enables the user to easily check whether correction processing on a correction target defect is appropriate. Moreover, it is desirable that, in the progress level display screen, a structure image as well as the progress level calculation result be displayed. For example, in the progress level display screen, an image obtained by superimposing the first image and the reference defect on each other and an image obtained by superimposing the second image and the corrected image on each other are displayed as well as the progress level. This enables the user to easily check a progress level calculation result of defects in consideration of the texture of the wall surface.

Moreover, in the progress level display screen, it is desirable that displaying of the corrected defect and displaying of another correction candidate which has not been selected by the correction candidate selection unit 126 be able to be switched to each other. In this case, the information processing apparatus 100 causes the display unit 105 to display, for example, other correction candidates 1031, 1032, and 1033 in descending order of matching level at a lower portion of the window 1000 illustrated in FIG. 10. Then, in response to selection of a correction candidate by the user, the information processing apparatus 100 causes the display unit 105 to display the selected correction candidate at a display portion for the corrected defect 1011 in the window 1000. This enables the user to easily compare the reference defect and the selected correction candidate with each other.

Furthermore, in the first exemplary embodiment, the respective progress levels of the other correction candidates 1031, 1032, and 1033 are still not been calculated. Therefore, it is desirable that a progress level on the selected correction candidate be able to be additionally calculated. In this case, in response to selection of a correction candidate by the user, the progress level calculation unit 128 performs progress level calculation processing using the reference defect and the selected correction candidate. Then, the information processing apparatus 100 displays the progress level as well as the correction candidate. Alternatively, the information processing apparatus 100 can be configured to cause the display unit 105 to display a progress level calculation button on the display screen and, in response to the user issuing an instruction, such as pressing the progress level calculation button, perform progress level calculation processing. In this way, it is more desirable to additionally calculate a progress level between the reference defect and the selected correction candidate.

As another method of displaying a display screen of the progress level calculation result, there is a method of displaying the reference defect and the corrected defect in superimposition on each other. Displaying the reference defect and the corrected defect in superimposition on each other enables the user to easily compare the respective shapes of the defects with each other in a direct manner. Furthermore, in a case where, in a display screen in which the reference defect and the corrected defect are superimposed on each other, a structure image is further superimposed, it is desirable that any one of the first image and the second image be able to be selected.

While, in an example of the progress level display screen illustrated in FIG. 10, a result of calculation of a progress level with respect to one reference defect is displayed, respective progress levels with respect to a plurality of reference defects can be collectively displayed. Thus, in this case, the information processing apparatus 100 causes the display unit 105 to display, in the progress level display screen, a plurality of reference defects selected by the user and a plurality of corrected defects with respect to the selected reference defects. Moreover, in a case where respective progress levels with respect to a plurality of reference defects are displayed, the progress level calculation unit 128 aggregates progress levels with respect to individual reference defects, and the information processing apparatus 100 causes the display unit 105 to display such aggregate results in the display screen. Thus, for example, the progress level calculation unit 128 aggregates progress levels of total extensions of all of the reference defects, and the information processing apparatus 100 causes the display unit 105 to display the aggregated total extensions in the progress level display screen.

Modification Example 1 of First Exemplary Embodiment

While, in the first exemplary embodiment, an example of calculating a progress level with use of a reference defect selected from the first defect data and a corrected defect obtained by correcting a correction target defect selected from the second defect data has been described, an example of selecting a reference defect from the second defect data is also conceivable. Thus, the information processing apparatus selects a reference defect from second defect data corresponding to a newer one of two images acquired at respective different times, and, on the other hand, corrects a defect selected from first defect data and calculates a progress level on defects with use of the reference defect and the corrected defect. With this processing, in a case where the accuracy of the position or shape of a defect in a past inspection result is low, it is possible to check how the defect has advanced while correcting the past inspection result in conformity with the latest inspection result.

Modification Example 2 of First Exemplary Embodiment

While, in the first exemplary embodiment, a method of generating a correction candidate based on a correction target defect selected from second defect data has been described, an example of generating a correction candidate from a second image is also conceivable. Specifically, a plurality of trained models previously caused to perform learning by machine learning is prepared, and the information processing apparatus detects a defect from a second image for every model, thus obtaining a plurality of detection results. Then, the information processing apparatus sets, as a correction candidate, defect data located near the reference defect in each of the plurality of detection results. This enables generating a wide variety of correction candidates. Furthermore, in processing for detecting a defect for every model from the second image, obtaining a plurality of detection results using a plurality of detection parameters enables generating a larger number of correction candidates.

According to the above-described first exemplary embodiment, even in a case where the shapes of defects, such as cracks, detected from images captured at respective different times differ, it is possible to correctly obtain a correspondence relationship between the defects by correcting the defect and thus appropriately calculate a progress level on the defects.

In the first exemplary embodiment, an example of comparing defects of the same type with each other, correcting the defects, and calculating a progress level has been described. Here, for example, as the deterioration of a wall surface advances, a plurality of types of defects may occur at the same position. For example, a crack and efflorescence may occur at the same portion of the wall surface. At this time, a part of the shape of a crack may be covered by efflorescence and become visually unrecognizable. If a part of the defect becomes visually unrecognizable, it becomes difficult to obtain a correspondence relationship between defects and, thus, it is impossible to calculate an appropriate progress level. Therefore, an information processing apparatus according to the second exemplary embodiment performs correction processing for performing interpolation on a portion in which a part of a defect has become hidden by another defect and become visually unrecognizable. This enables calculating a progress level in consideration of a portion which is visually unrecognizable. In the following description, the second exemplary embodiment is described with a focus on differences from the first exemplary embodiment.

Figure 11:
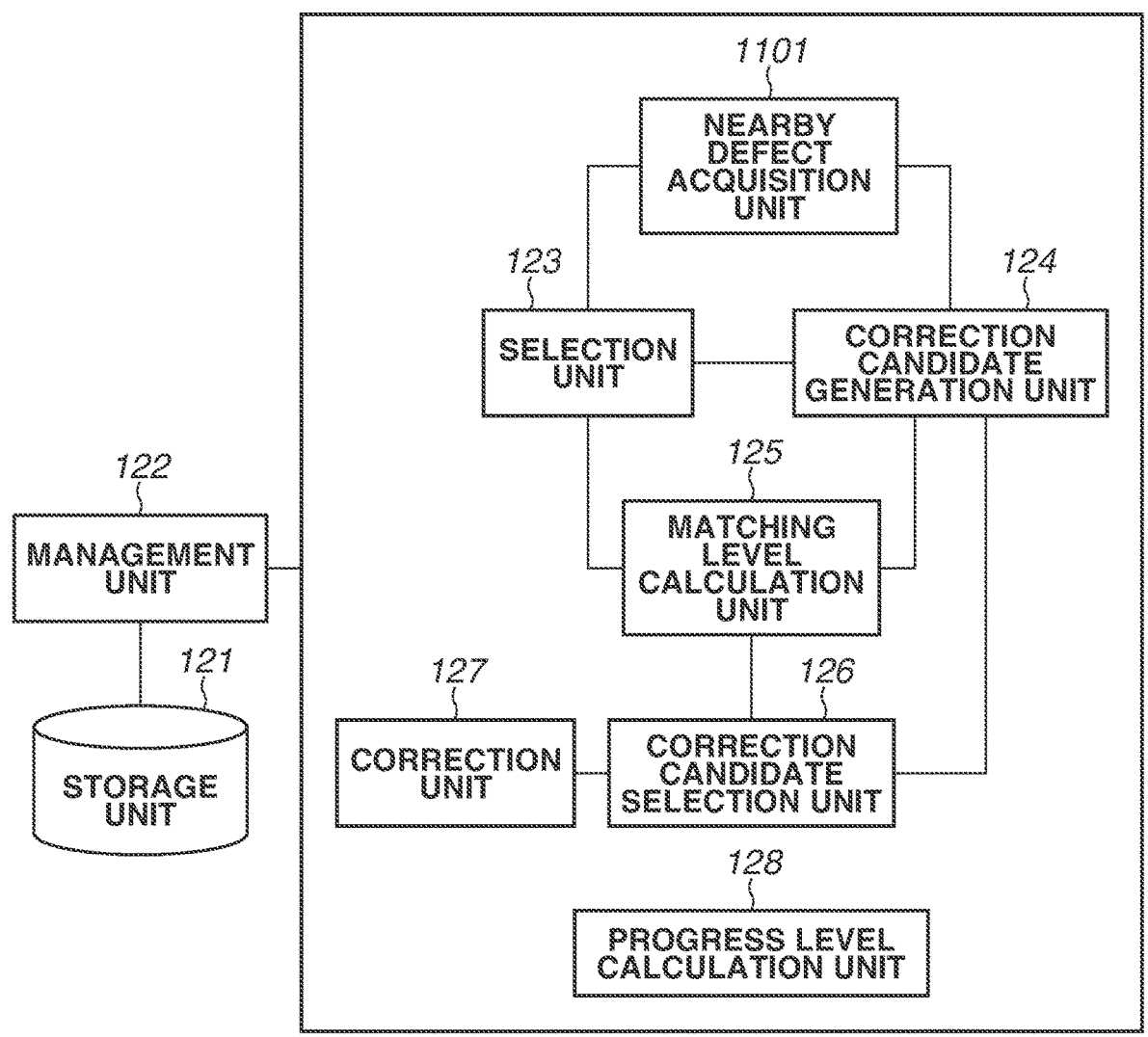
FIG. 11 is a diagram illustrating a functional configuration of an information processing apparatus according to a second exemplary embodiment.

The hardware configuration of the information processing apparatus 100 according to the second exemplary embodiment is similar to the configuration described in the first exemplary embodiment illustrated in FIGS. 1A and 1s, therefore, omitted from illustration and description. FIG. 11 is a block diagram illustrating an example of a functional configuration of the information processing apparatus 100 according to the second exemplary embodiment. The functional configuration illustrated in FIG. 11 differs in that a nearby defect acquisition unit 1101 is added to the functional configuration illustrated in FIG. 1B in the first exemplary embodiment. The nearby defect acquisition unit 1101, which is a functional part of the CPU 101, acquires, as a nearby defect, a defect existing near the reference defect and differing in defect type from the reference defect out of the second defect data. Moreover, in the second exemplary embodiment, the correction candidate generation unit 124 generates a correction candidate by performing modification in such a way as to perform interpolation on the shape data about the correction target defect using the nearby defect.

Figure 12:
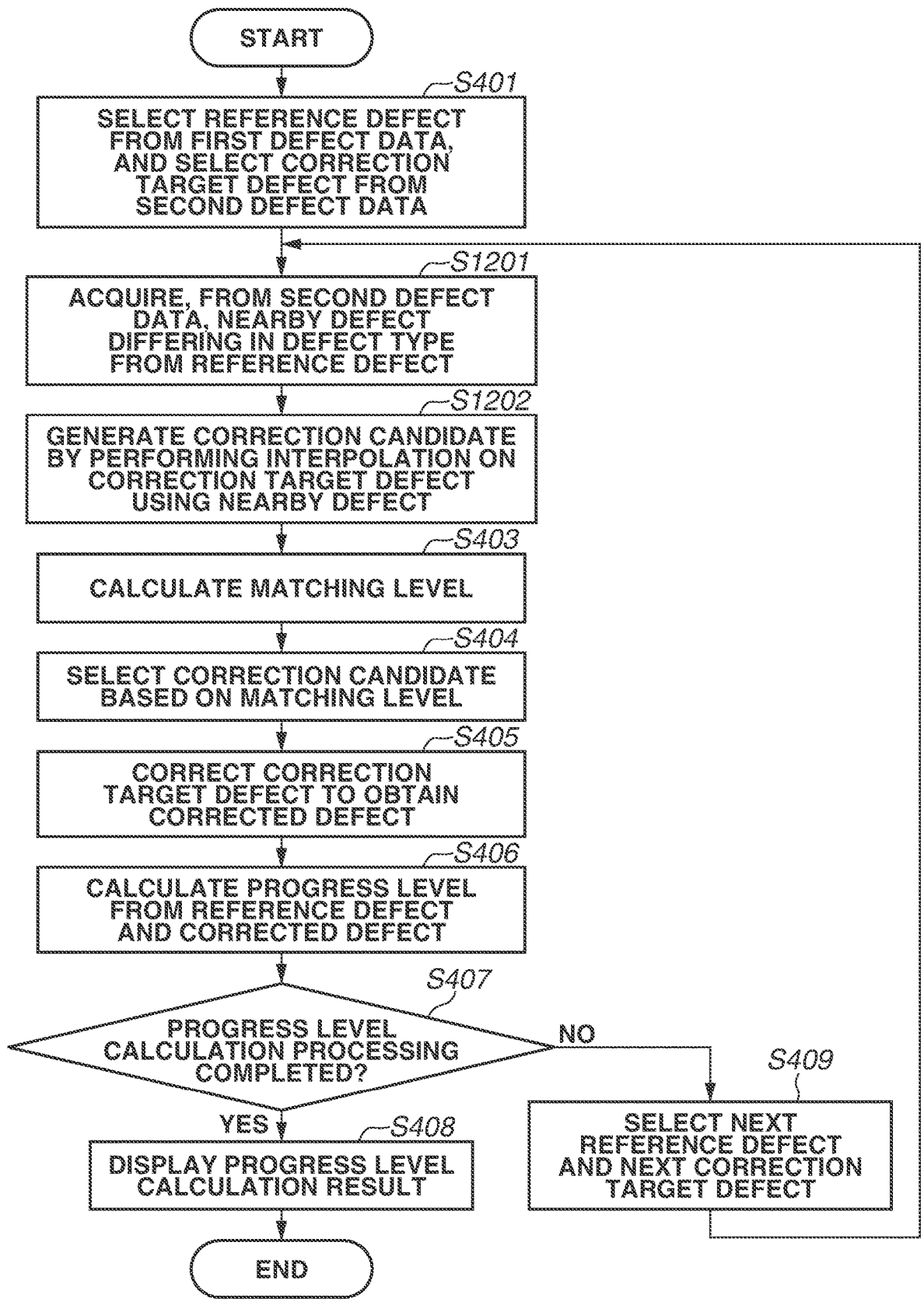
FIG. 12 is a flowchart of information processing according to the second exemplary embodiment.

FIG. 12 is a flowchart illustrating the main flow of information processing which the information processing apparatus 100 according to the second exemplary embodiment performs. In the flowchart of FIG. 12, in steps with the respective same step numbers as those in the flowchart of FIG. 4 described in the first exemplary embodiment, processing operations similar to those in the first exemplary embodiment are performed. In the case of the second exemplary embodiment, after the reference defect and the correction target defect are selected in step S401, the information processing apparatus 100 advances the processing to step S1201.

In step S1201, the nearby defect acquisition unit 1101 acquires, as a nearby defect, defect data existing near the reference defect and differing in defect type from the reference defect out of the second defect data. Details of processing in the nearby defect acquisition unit 1101 are described below.

Next, in step S1202, the correction candidate generation unit 124 generates a correction candidate by performing modification in such a way as to perform interpolation on the shape of the correction target defect using the nearby defect. Details of processing to be performed by the correction candidate generation unit 124 in the case of the second exemplary embodiment are described below. Then, the information processing apparatus 100 advances the processing to matching level calculation processing in step S403. Processing operations in step S403 and subsequent steps are similar to those described in the first exemplary embodiment and are, therefore, omitted from description. Furthermore, in the case of the second exemplary embodiment, after step S409, the information processing apparatus 100 returns the processing to step S1201.

<Acquisition of Nearby Defect>

Processing in step S1201 for acquiring, as a nearby defect, a defect existing near the reference defect and differing in defect type from the reference defect out of the second defect data is described with reference to FIGS. 13A and 13B. In describing the second exemplary embodiment, the defect type of the reference defect is assumed to be a crack.

Figure 13A:
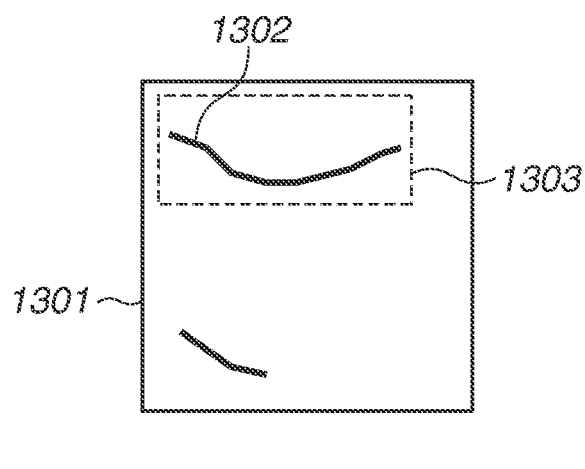
FIGS. 13A and 13B are diagrams used to explain an example of selecting a nearby defect.
Figure 13B:
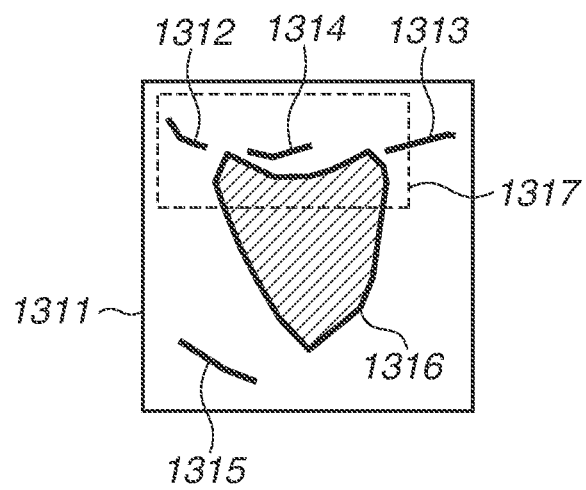

FIG. 13A is a diagram illustrating first defect data 1301. Out of the first defect data 1301, a crack 1302 is assumed to be selected as a reference defect. FIG. 13B is a diagram illustrating second defect data 1311. The second defect data 1311 is assumed to be defect data including cracks 1312, 1313, 1314, and 1315 and efflorescence 1316.

In selecting a nearby defect from the second defect data, first, the nearby defect acquisition unit 1101 obtains a rectangular range surrounding the reference defect. A rectangular range 1303 illustrated in FIG. 13A is an example of the rectangular range corresponding to the crack 1302 serving as the reference defect.

Next, the nearby defect acquisition unit 1101 superimposes the rectangular range 1303 on the second defect data 1311, thus obtaining a rectangular range 1317.

Then, the nearby defect acquisition unit 1101 acquires, as a nearby defect, a defect at least a part of which is included in the rectangular range 1317 on the second defect data 1311 and the defect type of which differs from the defect type of the reference defect. In the case of this example, the nearby defect acquisition unit 1101 acquires, as a nearby defect, efflorescence 1316, which is a defect other than cracks.

<Generation of Correction Candidate>

Correction candidate generation processing in step S1202 in the second exemplary embodiment is described with reference to FIGS. 14A, 14B, 14C, 14D, and 14E.

Figure 14A:
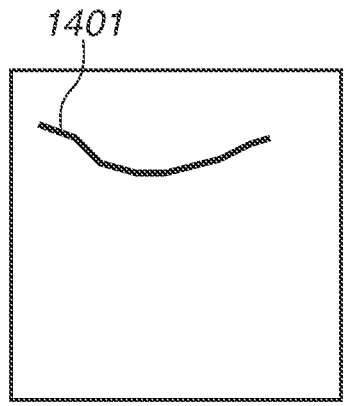
FIGS. 14A, 14B, 14C, 14D, and 14E are diagrams used to explain an example of generating a correction candidate obtained by performing interpolation on a visually unrecognizable defect portion.
Figure 14B:
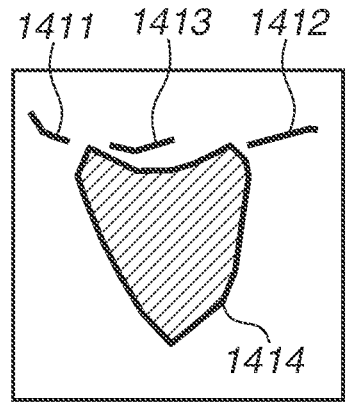

FIG. 14A is a diagram illustrating a crack 1401, which has been selected as a reference defect from the first defect data. FIG. 14B is a diagram illustrating cracks 1411, 1412, and 1413, which have been selected as correction target defects from the second defect data, and efflorescence 1414, which has been selected as a nearby defect.

Figure 14C:
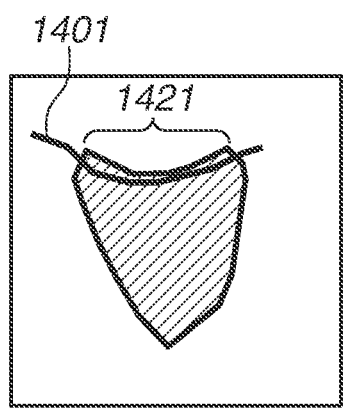
Figure 14D:
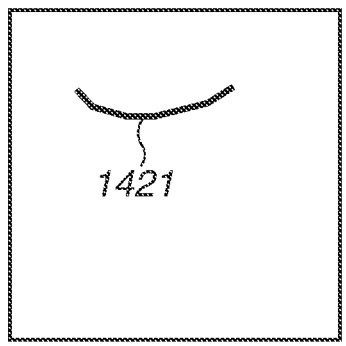

In generating a correction candidate, first, the correction candidate generation unit 124 acquires, as an invisible defect, a defect portion included in the reference defect and overlapping the nearby defect. Specifically, the correction candidate generation unit 124 overlaps the nearby defect and the shape of the reference defect on each other and thus obtains a portion included in the reference defect and overlapping the nearby defect. FIG. 14C illustrates a specific example of a state in which the crack 1401 and the efflorescence 1414 are overlapped on each other. The correction candidate generation unit 124 obtains, as an invisible defect, a partial crack 1421 overlapping the efflorescence 1414 included in the crack 1401 illustrated in FIG. 14C. FIG. 14D illustrates a state in which only the partial crack 1421 has been extracted.

Figure 14E:
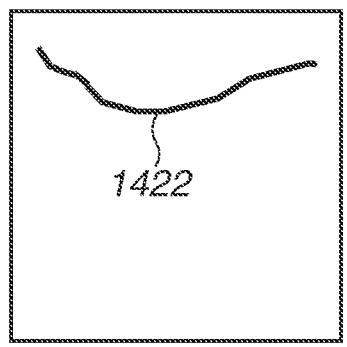

Next, the correction candidate generation unit 124 generates a correction candidate using the invisible defect and the correction target defect. Here, as one of methods of generating a correction candidate, there is a method of joining an end point of the invisible defect and an end point of the correction target defect to each other. In this method, the correction candidate generation unit 124 joins an end point of any crack of the cracks 1411, 1412, and 1413 illustrated in FIG. 14B to at least one end point of the partial crack 1421 illustrated in FIG. 14D. FIG. 14E is a diagram illustrating a correction candidate 1422 obtained by performing modification in such a way as to, for example, join the partial crack 1421 to the cracks 1411 and 1412. The thus-obtained correction candidate 1422 is found to be similar in position and shape to the crack 1401 illustrated in FIG. 14A.

In this way, it is possible to generate a correction candidate by using a portion (invisible defect) included in the reference defect and overlapping the nearby defect and a correction target defect.

According to the second exemplary embodiment, it is possible to perform correction processing in such a way as to compare defects differing in defect type and perform interpolation on a defect portion which has become visually unrecognizable due to overlapping of the defects. Accordingly, according to the second exemplary embodiment, it becomes possible to calculate a progress level on defects in consideration of a visually unrecognizable defect portion.

In the first exemplary embodiment, an example of calculating a matching level between the reference defect and the correction candidate and correcting the correction target defect based on a comparison in the matching level has been described. Here, a defect which does not require correction processing may be included in the defects based on which to calculate a progress level. If correction processing is performed on a defect which does not require correction processing, a wasted time for generating a correction candidate may be taken. Therefore, before generating a correction candidate, an information processing apparatus according to a third exemplary embodiment calculates an index for determining whether to generate a correction candidate and then determines whether to generate a correction candidate based on a comparison between the calculated index and a predetermined threshold value (hereinafter referred to as an "index reference value"). Then, the information processing apparatus generates a correction candidate only in a case where the calculated index is less than the index reference value. There is a method of using at least any one of a plurality of indices explained below as an index for determining whether to generate a correction candidate. For example, there is a method of using a pre-correction matching level between the reference defect and the correction target defect. In the following description, the third exemplary embodiment is described with a focus on differences from the first exemplary embodiment.

Figure 15:
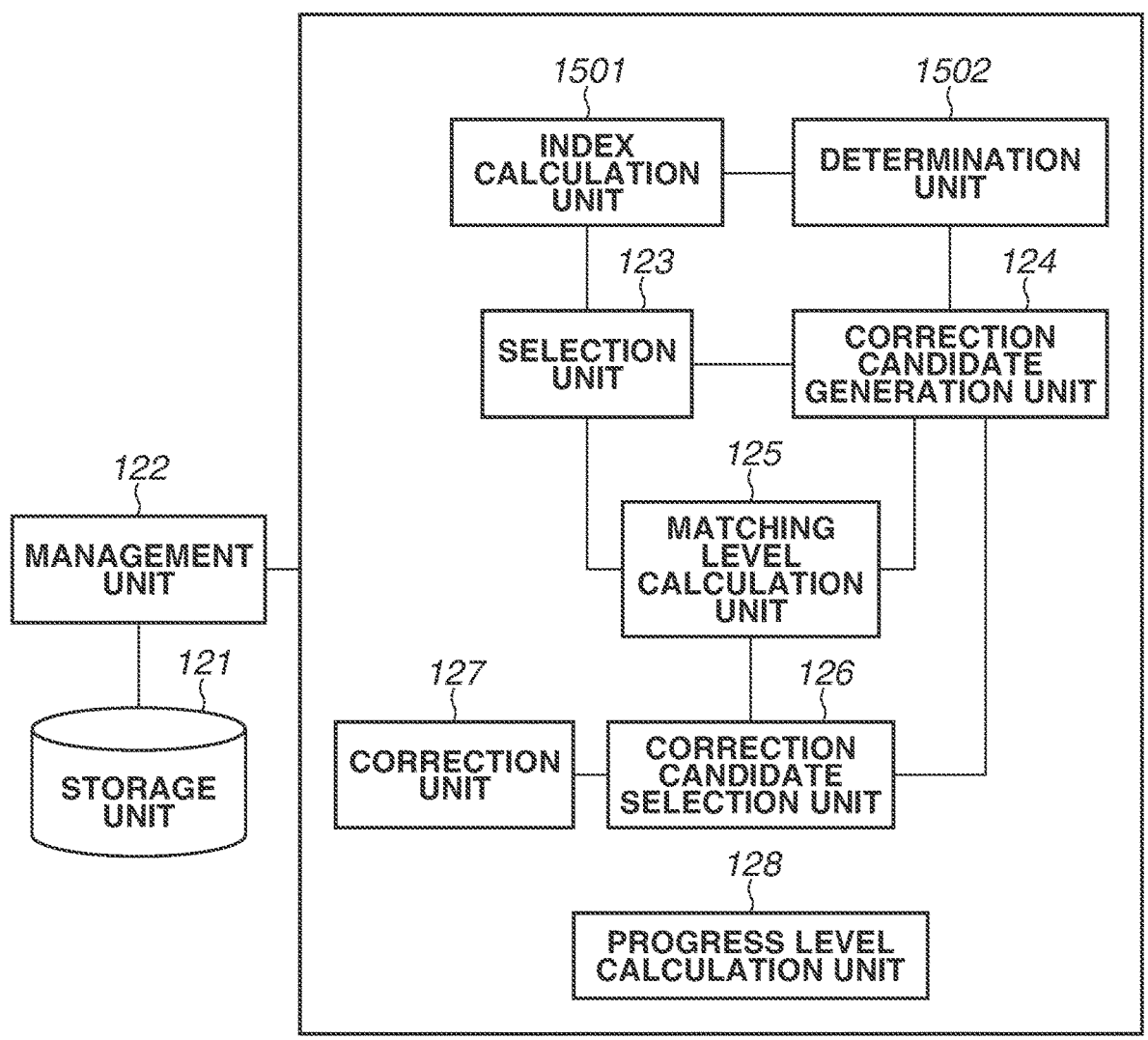
FIG. 15 is a diagram illustrating a functional configuration of an information processing apparatus according to a third exemplary embodiment.

The hardware configuration of the information processing apparatus 100 according to the third exemplary embodiment is similar to the configuration described in the first exemplary embodiment illustrated in FIG. 1A and is, therefore, omitted from illustration and description. FIG. 15 is a block diagram illustrating an example of a functional configuration of the information processing apparatus 100 according to the third exemplary embodiment. The information processing apparatus 100 according to the third exemplary embodiment differs in that an index calculation unit 1501 and a determination unit 1502 are added to the functional configuration illustrated in FIG. 1B in the first exemplary embodiment.

The index calculation unit 1501, which is a functional part of the CPU 101, calculates an index for determining whether to generate a correction candidate, with use of the reference defect and the correction target defect. Details of processing to be performed by the index calculation unit 1501 are described below.

The determination unit 1502, which is a functional part of the CPU 101, determines whether to generate a correction candidate, based on the index calculated by the index calculation unit 1501. Details of processing to be performed by the determination unit 1502 are described below.

Figure 16:
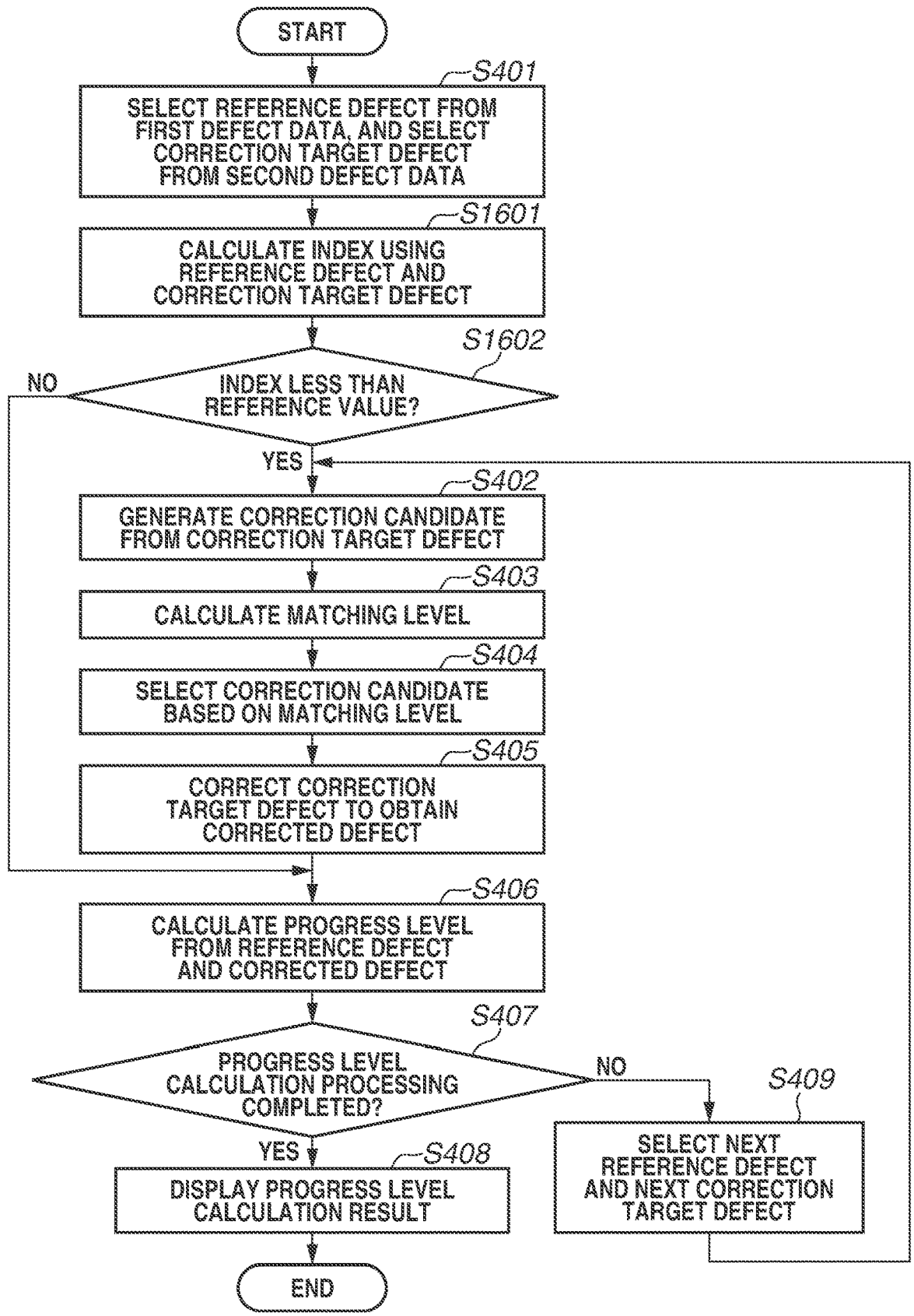
FIG. 16 is a flowchart of information processing according to the third exemplary embodiment.

FIG. 16 is a flowchart illustrating the main flow of information processing which the information processing apparatus 100 according to the third exemplary embodiment performs. In the flowchart of FIG. 16, in steps with the respective same step numbers as those in the flowchart of FIG. 4 described in the first exemplary embodiment, processing operations similar to those in the first exemplary embodiment are performed. In the case of the third exemplary embodiment, after the reference defect and the correction target defect are selected in step S401, the information processing apparatus 100 advances the processing to step S1601.

In step S1601, the index calculation unit 1501 calculates an index for determining whether to generate a correction candidate, with use of the reference defect and the correction target defect. Then, the information processing apparatus 100 advances the processing to step S1602.

In step S1602, the determination unit 1502 determines whether the index calculated by the index calculation unit 1501 is less than the index reference value. Then, if it is determined that the calculated index is less than the index reference value (YES in step S1602), the information processing apparatus 100 advances the processing to step S402 for correction candidate generation processing. Processing operations in step S402 and subsequent steps are similar to those described in the first exemplary embodiment and are, therefore, omitted from description.

On the other hand, if, in step S1602, it is determined that the calculated index is greater than or equal to the index reference value (NO in step S1602), the information processing apparatus 100 advances the processing to step S406. In a case where, as a result of determination in step S1602, the processing has proceeded to step S406, since correction processing in step S405 has not been performed and there is no corrected defect, then in step S406, the progress level calculation unit 128 calculates a progress level using the reference defect and the correction target defect. Details of the correction target defect for use in calculating a progress level are described below.

Furthermore, in the case of the third exemplary embodiment, after step S409, the information processing apparatus 100 returns the processing to step S402.

<Calculation of Index for Determining Correction Candidate Generation>

Processing in step S1601 for calculating an index for determining whether to generate a correction candidate is described with reference to FIGS. 17A, 17B, 17C, 17D, and 17E.

FIG. 17A is a diagram illustrating a reference defect 1701, and FIG. 17B is a diagram illustrating correction target defects 1711, 1712, and 1713. Here, as one of determination indices, there is a method of setting, as an index, a pre-correction matching level between the reference defect and the correction target defect. For a method of calculating the pre-correction matching level, a method similar to the matching level calculation processing method in step S403 in the first exemplary embodiment can be used. For example, in a case where the pre-correction matching level calculated as an index by the index calculation unit 1501 is low and thus less than the index reference value, which is a predetermined threshold value for the index, since the similarity in shape between the reference defect and the correction target defect is low, the determination unit 1502 is able to determine that there is a need to perform correction processing. Thus, in a case where the pre-correction matching level is less than the index reference value, the determination unit 1502 is able to determine that it is necessary to generate a correction candidate from the correction target defect and perform correction processing of the correction target defect based on the correction candidate. FIG. 17C is a diagram illustrating examples of pre-correction matching levels between the reference defect 1701 and the correction target defects 1711, 1712, and 1713 in a case where the degree of overlap of defects is assumed to be a pre-correction matching level.

Moreover, as an index for determining whether to generate a correction candidate, another index can be used. For example, there is a method of setting the number of correction target defects as an index and performing determination with use of an index reference value for the index (number). Here, in a case where there is a plurality of correction target defects, there is a possibility of being able to generate a correction candidate similar in shape to the reference defect with use of the plurality of correction target defects. For example, in the case of the example illustrated in FIG. 17B, the number of correction target defects is 3. On the other hand, if the number of correction target defects is too large, generation processing for a correction candidate similar in shape to the reference defect becomes enormous. Therefore, in a case where the number of correction target defects calculated as an index by the index calculation unit 1501 is less than the index reference value, the determination unit 1502 determines that it is possible to generate an appropriate number of correction candidates similar in shape to the reference defect without the need for enormous processing, and thus determines to perform processing for generating a correction candidate.

Additionally, as another determination index, there is conceivable a method of using a progress level between the reference defect and the correction target defect (pre-correction progress level) and performing determination using an index reference value for the pre-correction progress level. For example, in a case where, although the wall surface of a structure has not been repaired, the pre-correction progress level has become a negative value, it is possible to determine that the correspondence relationship between defects has a high probability of being wrong. In this case, when the pre-correction progress level becomes a value in the negative direction from "0" since the correspondence relationship between defects has a high probability of being wrong, the determination unit 1502 determines not to perform generation processing for a correction candidate. Thus, the case where, although the wall surface of a structure has not been repaired, the pre-correction progress level has become a negative value represents a case where, for example, in the case of a crack, although the crack has not been repaired, the crack has become short. In this case, the correction target defect has a high possibility of being originally a defect which is not to be targeted for comparison with the reference defect. Therefore, to prevent a correction candidate from being generated from the correction target defect, the determination unit 1502 determines not to perform generation processing for a correction candidate. On the other hand, in a case where the pre-correction progress level becomes less than the index reference value with respect to a value in the negative direction, in other words, in a case where the pre-correction progress level becomes a value in the positive direction with "0" set as the index reference value, the correspondence relationship between defects is considered to have no (have a very low) possibility of being wrong. Therefore, in a case where the pre-correction progress level becomes less than the index reference value with respect to a value in the negative direction, the determination unit 1502 determines to perform generation processing for a correction candidate. Thus, in this case, since the correction target defect is a defect having a high possibility of being targeted for comparison with the reference defect, the determination unit 1502 determines to perform generation processing for a correction candidate.

A method of obtaining the pre-correction progress level is described with reference to FIGS. 17D and 17E.

FIG. 17D is a diagram illustrating a reference defect 1721, and FIG. 17E is a diagram illustrating correction target defects 1731 and 1732 corresponding to the reference defect 1721. In calculating a pre-correction progress level, the index calculation unit 1501 selects one defect 1731 from among the correction target defects. Furthermore, as an example of the pre-correction progress level, a difference in total extension can be used. Here, in a case where the total extension of the reference defect 1721 is 50 mm and the total extension of the correction target defect 1731 is 30 mm, the pre-correction progress level becomes minus 20 mm With regard to the remaining correction target defect 1732, a similar method can also be used to obtain a difference in total extension from the reference defect 1721.

Additionally, as another index, an angle between a line segment connecting a start point and end point of the reference defect and a line segment connecting a start point and end point of each defect of the correction target defects (hereinafter referred to as an "inter-defect angle") can be used, and there is conceivable a method of performing determination using an index reference value with respect to the inter-defect angle. Here, in a case where the inter-defect angle is large (in other words, the respective orientations of defects are different), it is determinable that the correspondence relationship between defects has a high possibility of being wrong. Furthermore, coordinate information about the reference defect and the correction target defect is previously stored in the storage unit 121. Accordingly, the index calculation unit 1501 is able to obtain line segments each connecting start point coordinates and end point coordinates included in coordinate information about each defect acquired from the storage unit 121 and then calculate an angle between two line segments as an inter-defect angle, thus setting the inter-defect angle as an index. In the case of this example, in a case where the inter-defect angle is less than the index reference value (in other words, a difference between the respective orientations of the defects is small), the determination unit 1502 determines that the correspondence relationship between the defects has a low possibility of being wrong and thus determines to perform generation processing for a correction candidate.

<Determination of Necessity of Correction>

As mentioned above, in step S1602, the determination unit 1502 determines whether to generate a correction candidate, based on a comparison between the index calculated by the index calculation unit 1501 and the index reference value. Here, the pre-correction matching level is assumed to be used as the determination index. In this case, the determination unit 1502 determines whether to generate a correction candidate, based on a comparison between the index being the pre-correction matching level and the index reference value. The formula for determining whether to generate a correction candidate, based on the matching level is shown as formula (4) below.

$$I_p < I_c \tag{4}$$

Here, parameter $I_p$ is a pre-correction matching level in the p-th correction target defect, and the pre-correction matching level calculated in step S1601 is input to the parameter $I_p$. Parameter $I_c$ is an optional fixed value indicating the index reference value, which is a threshold value for determination. For example, in the case of setting, as a determination criterion, whether the matching level is greater than or equal to 50%, "0.5" can set to the parameter L. In a case where a plurality of pre-correction matching levels has been calculated, while keeping the value of the parameter $I_c$ fixed, the determination unit 1502 inputs another pre-correction matching level to the parameter $I_p$ and repeats determination processing corresponding to formula (4). Then, if, as a result of determination, all of the pre-correction matching levels satisfy formula (4), the information processing apparatus 100 advances the processing to step S402 for correction candidate generation processing. On the other hand, if it is determined by the determination unit 1502 that not all of the pre-correction matching levels satisfy formula (4), the information processing apparatus 100 deems, as a corrected defect, a correction target defect having the largest pre-correction matching level, skips correction candidate generation processing, and then advances the processing to step S406 for progress level calculation processing.

In a case where a determination index other than the pre-correction matching level is used, the determination unit 1502 is also able to perform determination using formula (4). For example, in the case of using a pre-correction progress level calculated from the reference defect and the correction target defect, the determination unit 1502 is also able to determine whether to generate a correction candidate, with use of formula (4). In the case of using the pre-correction progress level, the pre-correction progress level is input to the parameter $I_p$ in formula (4), and an optional fixed value indicating a threshold value for determination is set to the parameter L as an index reference value. In a case where whether the pre-correction progress level is a negative value is set as a determination criterion, "0" can be set to the parameter $I_c$. In a case where a plurality of pre-correction progress levels has been calculated, while keeping the value of the parameter $I_c$ fixed, the determination unit 1502 inputs the plurality of pre-correction progress levels in sequence to the parameter $I_p$ and repeats determination processing corresponding to formula (4). Then, if, as a result of determination, all of the pre-correction progress levels satisfy formula (4), the information processing apparatus 100 advances the processing to step S402 for correction candidate generation processing. On the other hand, if it is determined by the determination unit 1502 that not all of the pre-correction progress levels satisfy formula (4), the information processing apparatus 100 advances the processing to step S406 for progress level calculation processing. However, since the maximum value of the calculated pre-correction progress levels is able to be regarded as a progress level calculation result in step S406, the information processing apparatus 100 can advance the processing directly to step S407.

As described above, the third exemplary embodiment is configured to perform processing for calculating an index for determining whether to generate a correction candidate with use of defects obtained before correction and, only in a case where the calculated index is less than an index reference value, generating a correction candidate. In the third exemplary embodiment, since correction candidate calculation processing and matching level calculation processing are able to be performed with respect to only defects requiring correction processing, it is possible to prevent or reduce an increase in processing time.

In the first exemplary embodiment, an example of calculating a progress level by performing correction processing for each of individual defects has been described. Here, as the deterioration of a structure advances, a large number of (e.g., 1000 or more) defects occur at the wall surface of the structure. To obtain progress levels of a large number of defects occurring at the wall surface, it is necessary to repeat correction processing for each of individual defects, so that processing time may increase by a large amount. Therefore, in a fourth exemplary embodiment, an example of collectively correcting a plurality of pieces of defect data is described. Specifically, the fourth exemplary embodiment is configured to segment an image, group pieces of defect data for every segmented region, and correct defect data on a group by group basis. As a method of correcting defect data on a group by group basis, for example, there is a method of regarding defect data with less than a predetermined size as noise and removing such defect data. Correcting defect data on a group by group basis enables, while preventing or reducing an increase in processing time, correcting a large number of pieces of defect data to calculate progress levels. In the following description, the fourth exemplary embodiment is described with a focus on differences from the first exemplary embodiment.

Figure 18:
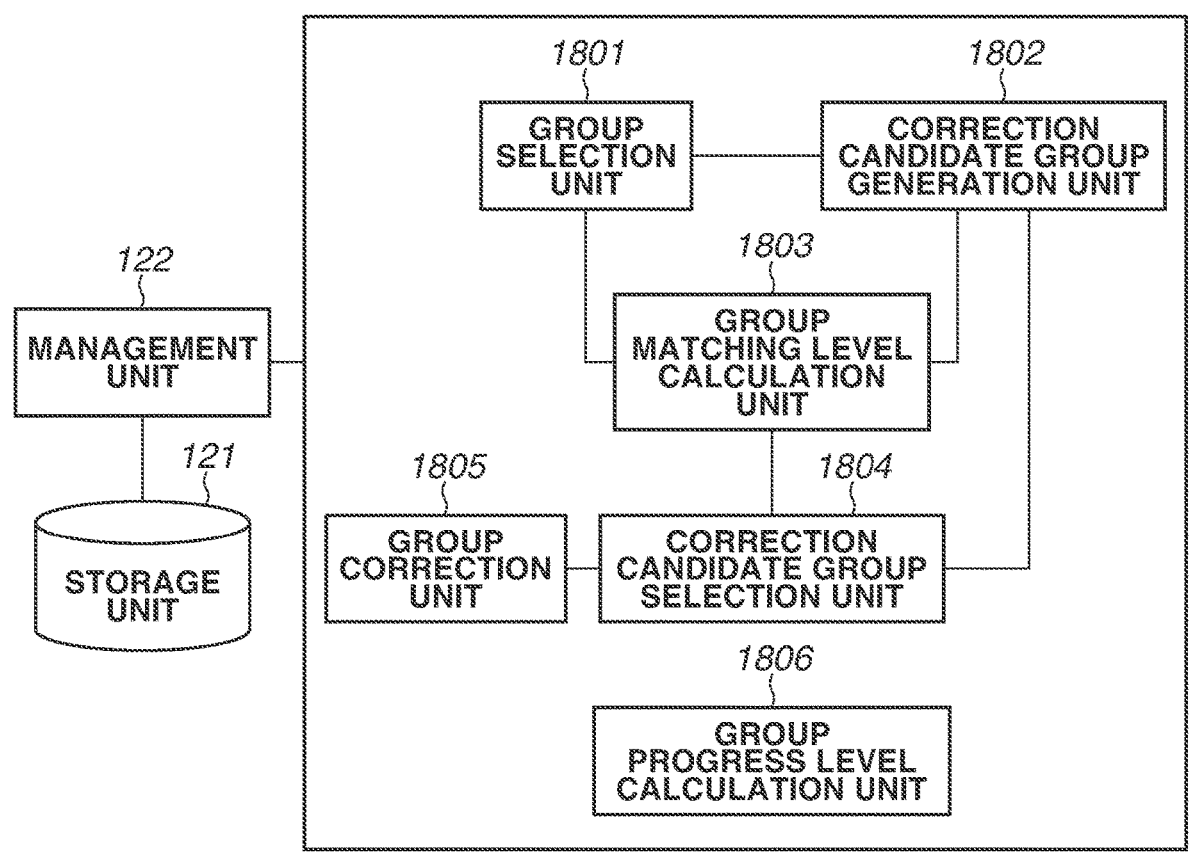
FIG. 18 is a diagram illustrating a functional configuration of an information processing apparatus according to a fourth exemplary embodiment.

The hardware configuration of the information processing apparatus 100 according to the fourth exemplary embodiment is similar to the configuration described in the first exemplary embodiment illustrated in FIGS. 1A and 1s, therefore, omitted from illustration and description. FIG. 18 is a block diagram illustrating an example of a functional configuration of the information processing apparatus 100 according to the fourth exemplary embodiment. A storage unit 121 and a management unit 122 illustrated in FIG. 18 are similar to those illustrated in FIG. 1B in the first exemplary embodiment and are, therefore, omitted from description.

A group selection unit 1801, which is a functional unit of the CPU 101, selects a reference defect group from the first defect data and selects a correction target defect group corresponding to the reference defect group from the second defect data.

A correction candidate group generation unit 1802, which is a functional unit of the CPU 101, generates a correction candidate group from the correction target defect group.

A group matching level calculation unit 1803, which is a functional unit of the CPU 101, performs processing for calculating a matching level on a group by group basis based on the correction candidate group and the reference defect group.

A correction candidate group selection unit 1804, which is a functional unit of the CPU 101, performs processing for selecting a correction candidate group based on a result of calculation of the matching level on a group by group basis.

A group correction unit 1805, which is a functional unit of the CPU 101, corrects a correction target defect group based on a result of selection of the correction candidate group, thus obtaining a corrected defect group.

A group progress level calculation unit 1806, which is a functional unit of the CPU 101, calculates a difference between the reference defect group and the corrected defect group as a progress level.

Figure 19:
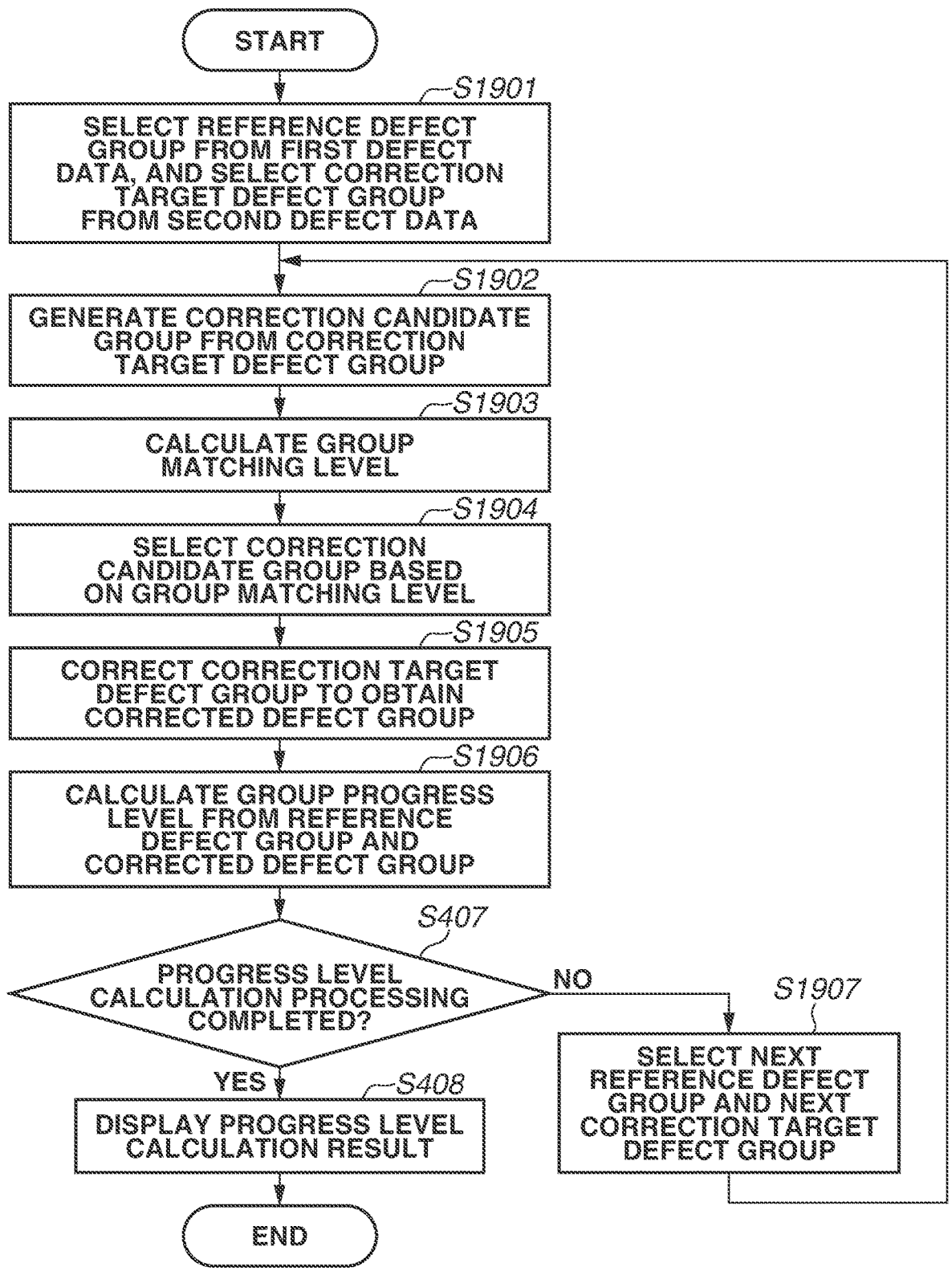
FIG. 19 is a flowchart of information processing according to the fourth exemplary embodiment.

FIG. 19 is a flowchart illustrating the main flow of information processing which the information processing apparatus 100 according to the fourth exemplary embodiment performs. In the flowchart of FIG. 19, in steps with the respective same step numbers as those in the flowchart of FIG. 4 described in the first exemplary embodiment, processing operations similar to those in the first exemplary embodiment are performed. In the following description, processing in steps S1901 to S1907 illustrated in FIG. 19 is described.

<Selection of Reference Defect Group and Correction Target Defect Group>

Figure 20B:
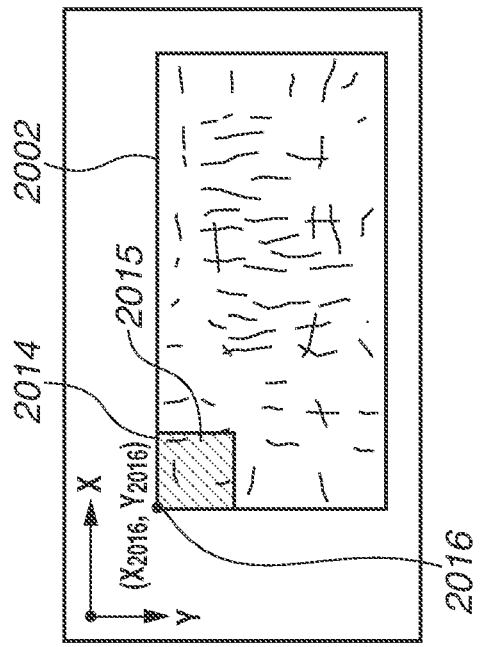
FIGS. 20A, 20B, 20C, and 20D are diagrams used to explain an example of selecting defect data on a group by group basis.
Figure 20D:
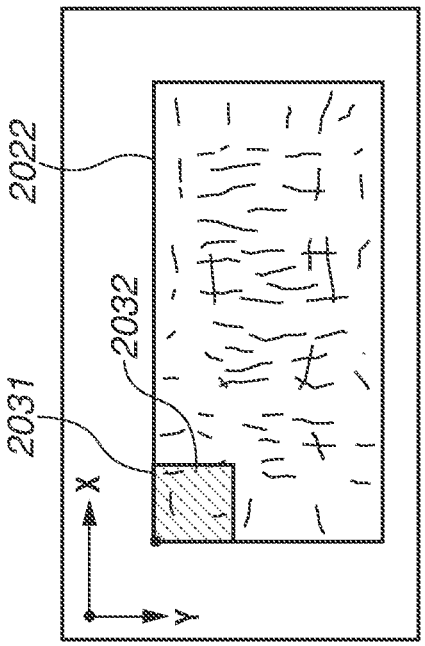
Figure 20A:
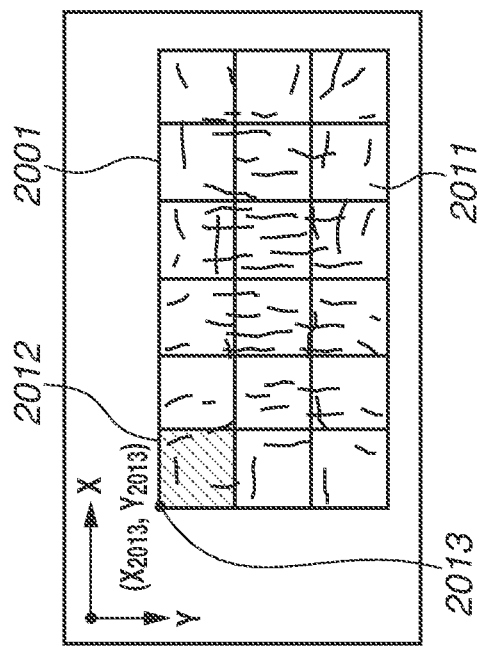
Figure 20C:
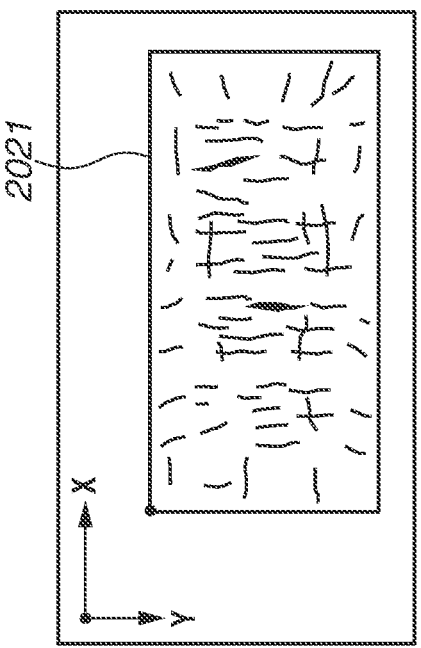

FIGS. 20A, 20B, 20C, and 20D are diagrams used to explain processing in step S1901, in which the group selection unit 1801 selects a reference defect group from the first defect data and selects a correction target defect group from the second defect data. FIG. 20A is a diagram illustrating a first image 2001, and FIG. 20B is a diagram illustrating first defect data 2002. FIG. 20C is a diagram illustrating a second image 2021, and FIG. 20D is a diagram illustrating second defect data 2022. In the fourth exemplary embodiment, defect data is assumed to be a crack on the wall surface of a structure as with the first exemplary embodiment. Moreover, as with the above-described exemplary embodiments, all of the first image and the second image and pieces of defect data corresponding to the respective images are pasted at the same position on the same drawing.

In step S1901, first, the group selection unit 1801 selects a reference defect group from the first defect data. Here, as a method of selecting a reference defect group, an example of grouping the first defect data for every segmented region is described.

First, the group selection unit 1801 segments the first image 2001 illustrated in FIG. 20A with an optional fixed size. Line segments 2011 in a lattice pattern illustrated in FIG. 20A are line segments with which to segment the first image 2001 at regular intervals in the X-axis direction and Y-axis direction. The group selection unit 1801 segments the first image 2001 at intervals of, for example, 1,024 pixels.

Next, the group selection unit 1801 selects one of the segmented regions. FIG. 20A illustrates an example in which one region 2012 indicated by hatching has been selected. Additionally, the group selection unit 1801 acquires the region size of the region 2012 and upper left vertex coordinates 2013 thereof. Then, the group selection unit 1801 sets, on the first defect data 2002, a region 2014 at the same position and with the same size as those of the region 2012, as illustrated in FIG. 20B. After that, the group selection unit 1801 groups defect data included in the region 2014 to obtain a reference defect group 2015.

Next, the group selection unit 1801 selects a correction target defect group corresponding to the reference defect group from the second defect data. As a method of selecting a correction target defect group, for example, there is a method of grouping second defect data included in a region at the same position and with the same range as those of the reference defect group.

Here, an example of selecting a correction target defect group corresponding to the reference defect group 2015 illustrated in FIG. 20B is described.

First, the group selection unit 1801 acquires the region size of the region 2014 and upper left vertex coordinates 2016 thereof. Next, the group selection unit 1801 sets, on the second defect data 2022 illustrated in FIG. 20D, a region 2031 at the same position and with the same range as those of the region 2014 illustrated in FIG. 20B. Then, the group selection unit 1801 groups second defect data included in the region 2031 to obtain a correction target defect group 2032. In this way, the group selection unit 1801 associates defect data groups included in in a region at the same position and with the same range with each other between the first defect data and the second defect data, thus selecting a correction target defect group corresponding to the reference defect group.

Here, since, usually, an image capturing condition varies in image capturing performed at respective different times, even when image capturing is performed on the same wall surface, position mismatches are included in between pixels of the first image and the second image. Accordingly, position mismatches are also included in between the first defect data and the second defect data. The above-mentioned example is an example of neglecting such position mismatches and generating a reference defect group and a correction target defect group in a simplified manner. The fourth exemplary embodiment is directed to roughly correcting defect data on a defect group by defect group basis. Therefore, usually, even if defect groups are not exactly associated with each other, a problem is unlikely to occur.

However, in a case where position mismatches between pieces of defect data are large, it is favorable to associate defect groups with each other in consideration of position mismatches. As a method of taking position mismatches into consideration, there is a method of regarding a position mismatch between images as a position mismatch between defect groups. In the case of this method, specifically, the group selection unit 1801 segments the first image and the second image with the same fixed size and obtains a difference in image feature quantity such as luminance value for every segmented region at the same position. Additionally, the group selection unit 1801 obtains a difference in image feature quantity while shifting positions of segmented regions of any one of the first and second images and thus acquires a position mismatch amount at a position in which the difference becomes minimum. Then, the group selection unit 1801 moves the position of the correction target defect group by the acquired position mismatch amount.

This enables the group selection unit 1801 to select a correction target defect group in consideration of position mismatches.

<Generation of Correction Candidate Group>

Figure 21A:
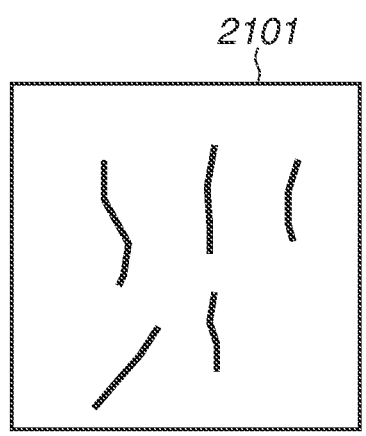
FIGS. 21A, 21B, 21C, 21D, and 21E are diagrams used to explain an example of generating a correction candidate on a group by group basis.
Figure 21B:
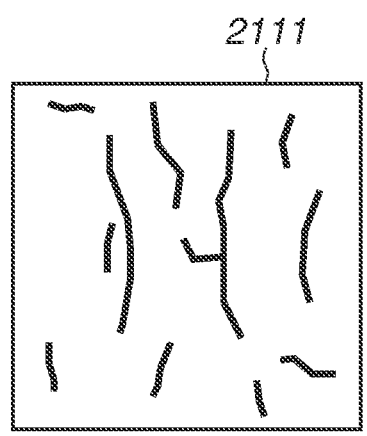

FIGS. 21A, 21B, 21C, 21D, and 21E are diagrams used to explain processing in step S1902 in which the correction candidate group generation unit 1802 generates a correction candidate group from the correction target defect group. FIG. 21A illustrates an example of a reference defect group 2101, and FIG. 21B illustrates a correction target defect group 2111 corresponding to the reference defect group 2101. The correction target defect group 2111 is assumed to include a large number of defects short in length as compared with the reference defect group 2101.

Figure 21C:
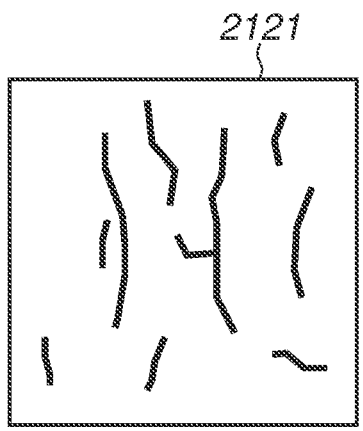
Figure 21D:
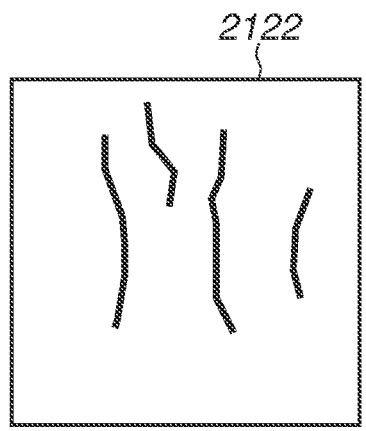
Figure 21E:
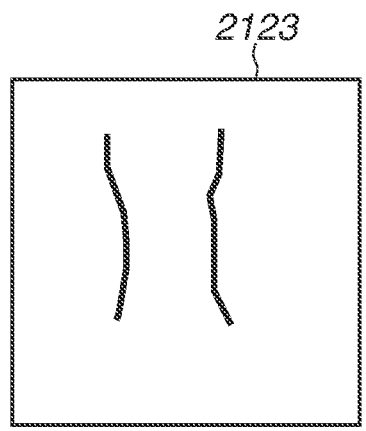

Here, as one of methods of generating a correction candidate group, there is a method of regarding a part of defect data as noise and removing such noise. For example, defect data detected from an image with use of machine learning includes erroneous detection (noise). Since defect data obtained by erroneous detection is a factor causing a calculation error of the progress level, the method of applying noise removal processing to defect data and collectively correcting a plurality of pieces of defect data is a favorable method. FIGS. 21C to 21E are diagrams illustrating results obtained by applying respective noise removal processing operations differing in strength to the correction target defect group 2111, as examples of generation of a correction candidate group obtained by noise removal. Correction candidate groups 2121 to 2123 illustrated in FIGS. 21C to 21E are examples in which results obtained by performing noise removal processing with respective different strengths of noise removal processing on the correction target defect group 2111 illustrated as an example in FIG. 21B are shown side by side in ascending order of the strength of noise removal processing. Out of these three examples, in the correction candidate group 2121 illustrated in FIG. 21C obtained in a case where the strength of noise removal processing is small, a large number of pieces of defect data included in the correction target defect group 2111 remain. On the other hand, in the correction candidate group 2123 illustrated in FIG. 21E obtained in a case where the strength of noise removal processing is large, minute pieces of defect data included in the correction target defect group 2111 are removed and only large pieces of defect data remain.

Moreover, as a method of generating a correction candidate group, a method other than noise removal can also be used. For example, the correction candidate group generation unit 1802 can be configured to generate a correction candidate group by using a method of joining the respective end points of nearby pieces of defect data. Here, defect data detected from an image with use of machine learning may become separated pieces of defect data due to the influence of blurring of an image. Then, the separated pieces of defect data are likely to become a factor causing a calculation error of the progress level. The correction candidate group generation unit 1802 joins the respective end points of nearby pieces of defect data to reduce the number of pieces of defect data separated due to the influence of blurring of an image, thus being able to reduce the occurrence of a calculation error of the progress level.

Moreover, in generating a correction candidate group, it is desirable to set the correction target defect group itself as one correction candidate group. The reason for this is that there is a case where a matching relationship between the correction target defect group and the reference defect group is high and, thus, it is not necessary to perform correction processing. When the correction target defect group itself is set as one correction candidate group, in processing in step S1903 and subsequent steps described below, a matching relationship with another correction candidate group is compared. As a result, if it is determined that a matching relationship of the correction candidate group being the correction target defect group itself is highest, it becomes possible to skip correction processing.

<Calculation of Group Matching Level>

In the following description, in the fourth exemplary embodiment, processing in step S1903 in which the group matching level calculation unit 1803 calculates a group matching level with use of the reference defect group and the correction candidate group is described. Here, as a method of calculating a group matching level, there is a method of obtaining, as a group matching level, the degree of coincidence of aggregated data aggregated from defect data included in each group. As the aggregated data, for example, a total value of degrees of overlap of defect data between groups is used. The formula for obtaining a group matching level C with use of the total value of degrees of overlap is shown as formula (5) below.

$$C = \frac{P_{11} \wedge P_{12}}{P_{11} \vee P_{12}} \quad (5)$$

Here, parameter $P_{11}$ is the defect pixel area of all of the pieces of defect data included in the reference defect group, and parameter $P_{12}$ is the defect pixel area of all of the pieces of defect data included in the correction target defect group. In calculating the parameter $P_{11}$ and $P_{12}$, the group matching level calculation unit 1803 counts, as a single pixel, pixels in which a plurality of defect overlaps each other in the same group. According to formula (5), in a case where the defect pixel areas coincide with each other, the group matching level C becomes "1", and, in a case where the defect pixel areas do not overlap each other at all, the group matching level C becomes "0". Thus, the group matching level C in the case of using the defect pixel areas ranges from "0" to "1".

Furthermore, position mismatches or shape mismatches are included in between the first defect data and the second defect data. Therefore, it is desirable to, in consideration of these mismatches, expand the shapes of pieces of defect data of the respective groups and then superimpose the shapes, thus obtaining the group matching level C. Thus, the group matching level calculation unit 1803 obtains one group matching level and then, while keeping the reference defect group selected, selects a different correction candidate group and calculates a group matching level using formula (5). The group matching level calculation unit 1803 repeats such group matching level calculation processing, thus being able to calculate a group matching level between the reference defect group and all of the correction candidate groups.

Moreover, in calculating a group matching level, aggregated data other than the above-mentioned aggregated data obtained from the total value of degrees of overlap of pieces of defect data between groups can also be used. For example, there is a method of using, as other aggregated data, the degree of change of the number of pieces of defect data between groups. In the case of this example, specifically, the group matching level calculation unit 1803 obtains the number of pieces of defect data of each of the reference defect group and the correction candidate group, obtains the reciprocal of a difference between the numbers of pieces of defect data, and sets the obtained reciprocal as a group matching level. With this processing, in a case where the difference between the numbers of pieces of defect data is large, the group matching level becomes a value close to "0". Furthermore, if there is no difference between the numbers of pieces of defect data (i.e., the difference being "0"), the group matching level calculation unit 1803 can set a constant larger than "1" as a group matching level. Additionally, as an example of using other aggregated data, the group matching level calculation unit 1803 can use, as a group matching level, the rate of change of total extensions of defect data between groups. The group matching level calculation unit 1803 is able to obtain a group matching level by using any one of various types of aggregated data between groups or using a combination of two or more of various types of aggregated data. In this way, the group matching level calculation unit 1803 is able to calculate a group matching level with use of aggregated data concerning defect groups.

<Selection of Correction Candidate Group>

FIGS. 22A, 22B, 22C, 22D, 22E, 22F, 22G, and 22H are diagrams used to explain processing in step S1904, in which the correction candidate group selection unit 1804 selects a correction candidate group based on a result of calculation of the group matching level.

Figure 22A:
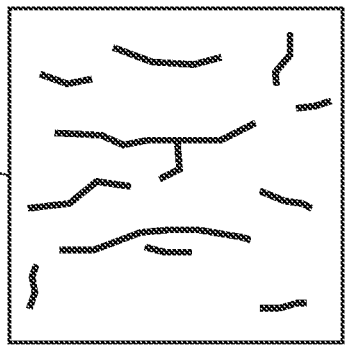
Figure 22B:
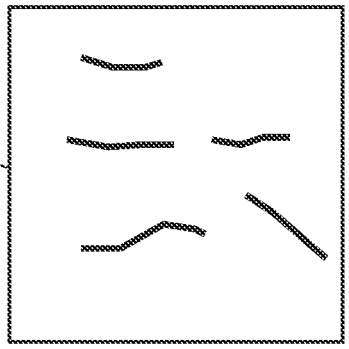
Figure 22F:
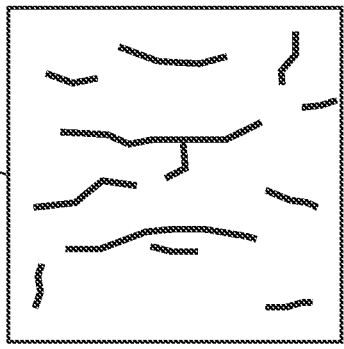
Figure 22E:
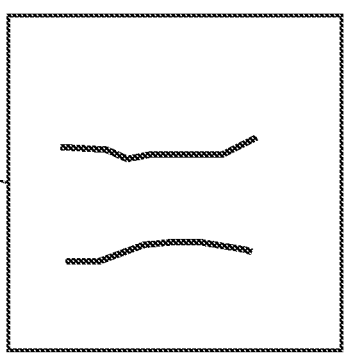
Figure 22D:
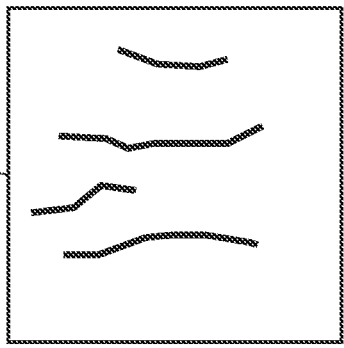
Figure 22C:
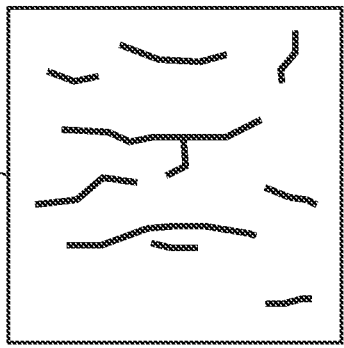

FIG. 22A is a diagram illustrating a reference defect group 2201, and FIG. 22B is a diagram illustrating a correction target defect group 2211. FIGS. 22C to 22F are diagrams respectively illustrating correction candidate groups 2221, 2222, 2223, and 2224 generated from the correction target defect group 2211. Furthermore, the correction candidate group 2224 illustrated in FIG. 22F is an example in which the correction target defect group 2211 itself has been set as one of correction candidate groups. Then, FIG. 22G is a diagram illustrating a group matching level list 2231 showing group matching levels between the correction candidate groups 2221, 2222, 2223, and 2224 and the reference defect group 2201. The group matching level for use in the fourth exemplary embodiment is assumed to be the degree of coincidence in the degree of overlap of pieces of defect data between groups. Accordingly, the group matching level ranges from "0" to "1", and indicates that, as the group matching level is closer to "1", a matching relationship between the reference defect group and the correction candidate group is higher.

Here, as one of methods of selecting a correction candidate group based on the group matching level, there is a method of selecting a correction candidate group in which the group matching level becomes maximum. For example, in the case of the group matching level list 2231 illustrated in FIG. 22G, the correction candidate group selection unit 1804 selects the correction candidate group 2222, in which the group matching level is maximum. In this way, in a case where there is only one maximum value of the group matching level, the correction candidate group selection unit 1804 is able to uniquely select a correction candidate group.

On the other hand, FIG. 22H is a diagram illustrating a group matching level list 2241 in a case where there is a plurality of maximum group matching levels. Furthermore, FIG. 22H illustrates a group matching level list 2241 regarding correction candidate groups 2251, 2252, 2253, and 2254 (not illustrated) generated from the correction target defect group 2211. In a case where, as illustrated in FIG. 22H, a plurality of group matching levels becomes maximum, the correction candidate group selection unit 1804 is not able to uniquely select a correction candidate group. In such a case, the information processing apparatus 100 generates a display image showing a plurality of correction candidate groups in which the group matching level becomes maximum and the reference defect group, and causes the display unit 105 to display the display image. Then, when the user views the display image and designates a correction candidate group, the correction candidate group selection unit 1804 selects the correction candidate group designated by the user.

Moreover, in a case where the maximum value of the group matching level is a value close to "0" (e.g., "0.1"), the correction candidate group to be selected has a high possibility of being inappropriate. In this case, when the maximum value of the group matching level is less than a predetermined threshold value (hereinafter referred to as a "group matching level reference value"), the information processing apparatus 100 generates a display image showing the reference defect group and the correction candidate group as well as the maximum value of the group matching level, and causes the display unit 105 to display the display image. Furthermore, the group matching level reference value includes, for example, "0.2". Then, it is desirable to allow the user to check and determine a correction candidate group based on the display image. In a case where a correction candidate group has been designated as a result of checking by the user via the display image, the correction candidate group selection unit 1804 selects the correction candidate group designated by the user.

Moreover, in some cases, selecting a correction candidate group in which the group matching level is maximum may be inappropriate. The reason for this is that, due to the progress of a defect, the defect pixel area is supposed to increase. In this case, for example, a target group matching level is previously set in conformity with the supposition of a progress tendency of the defect, and the correction candidate group selection unit 1804 selects a correction candidate group close to the target group matching level.

<Correction Processing for Defect Group>

Figure 23A:
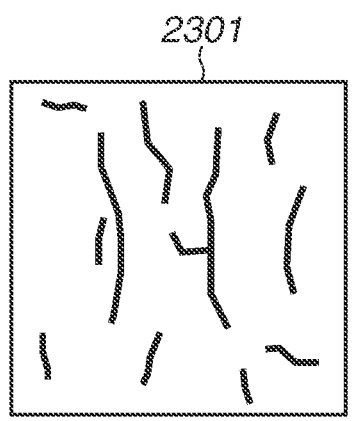
FIGS. 23A, 23B, and 23C are diagrams used to explain an example of performing correction processing on a group by group basis.
Figure 23B:
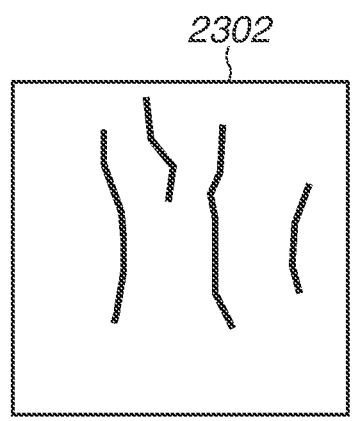

In step S1905, the group correction unit 1805 performs processing for correcting the correction target defect group based on a result of selection of the correction candidate group. A method of correcting the correction target defect group in the fourth exemplary embodiment is described with reference to FIGS. 23A, 23B, and 23C. FIG. 23A is a diagram illustrating a correction target defect group 2301, and FIG. 23B is a diagram illustrating a correction candidate group 2302.

Furthermore, the correction candidate group 2302 is a result obtained by regarding defect data with less than a given size as noise and removing such noise from the correction target defect group 2301.

Figure 23C:
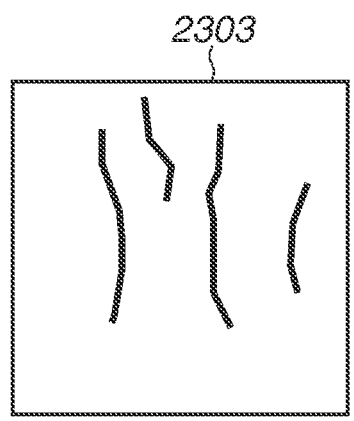

In correcting a correction target defect group, the group correction unit 1805 corrects attribute information included in the correction target defect group in conformity with attribute information included in the correction candidate group. Specifically, the group correction unit 1805 performs processing for deleting partial defect data included in the correction target defect group 2301 in such a manner that defect data included in the correction target defect group 2301 coincides with defect data included in the correction candidate group 2302. FIG. 23C is a diagram illustrating a corrected defect group 2303 obtained by performing correction processing.

Moreover, the group correction unit 1805 performs update processing for a defect data table in conjunction with the above-mentioned correction processing. Thus, the group correction unit 1805 performs update processing (e.g., deletion or addition of a deletion flag) on defect data targeted for deletion on the defect data table. The update processing for the defect data table is similar to the processing in step S405 in the first exemplary embodiment and is, therefore, omitted from description.

<Calculation of Group Progress Level>

In step S1906, the group progress level calculation unit 1806 performs processing for calculating a progress level on a group by group basis (group progress level) with use of the reference defect group and the corrected defect group. In the case of the fourth exemplary embodiment, the group progress level calculation unit 1806 performs processing for obtaining, as a progress level, a difference in attribute information about defect data between groups. For example, in a case where the defect type is a crack, the group progress level calculation unit 1806 calculates a difference in maximum width or total extension of defect data included in each group.

Furthermore, the maximum width and total extension of each crack are previously stored in the storage unit 121. Accordingly, the group progress level calculation unit 1806 acquires the maximum width and total extension of a defect included in each group and obtains a difference in maximum width and a difference in total extension between defect groups, thus being able to calculate a group progress level with respect to the reference defect group. Moreover, in a case where the defect type is other than a crack, the group progress level calculation unit 1806 is also able to calculate a group progress level in a similar way. For example, in a case where the defect type is reinforcing bar exposure, a difference in total area of defect data included in each group can be used as a group progress level.

The area of defect data is previously stored as attribute information in the storage unit 121. Accordingly, the group progress level calculation unit 1806 acquires a total area of defects included in the reference defect group and a total area of defects included in the corrected defect group and obtains a difference between the acquired total areas, thus being able to calculate a group progress level.

Modification Example of Fourth Exemplary Embodiment

While, in the fourth exemplary embodiment, a method of generating a correction candidate group based on a correction target defect group selected from the second defect data has been described, the correction candidate group can be generated from the second image. In this case, specifically, a plurality of trained models caused to perform learning by machine learning is previously prepared. Then, the information processing apparatus 100 detects a defect for every model with respect to the second image, thus obtaining a detection result for every model. After that, the information processing apparatus 100 obtains defect data corresponding to the position and range of a reference defect group with respect to each of a plurality of detection results, and sets the obtained pieces of defect data as a correction candidate group. This enables generating a plurality of correction candidate groups differing in correction tendency. Furthermore, in processing for detecting a defect for every model from the second image, the information processing apparatus 100 can use a plurality of detection parameters and obtain a detection result for every detection parameter, thus generating many more correction candidate groups.

As described above, the information processing apparatus 100 in the fourth exemplary embodiment groups a plurality of defects, collectively corrects defects on a group by group basis, and calculates a progress level on defects. Accordingly, according to the fourth exemplary embodiment, even in a case where a great number of defects exist on the wall surface, it is possible to efficiently correct a plurality of defects and prevent or reduce an increase in processing time.

While, in the first exemplary embodiment, a method of generating a correction candidate in a case where defect data is expressed by pixels has been described, at least a part of attribute information about defect data can be data expressed by vector data, such as a polyline, composed of a plurality of points as mentioned above. In a fifth exemplary embodiment, an example of generating a correction candidate from a correction target defect in a case where attribute information about defect data is expressed by vector data is described. In a case where attribute information about defect data is expressed by vector data, the amount of coordinate information becomes smaller than in a case where the attribute information is expressed by pixels, so that it becomes possible to decrease the data amount. Furthermore, a hardware configuration, a functional block diagram, and a flowchart illustrating a part of processing in the information processing apparatus 100 according to the fifth exemplary embodiment are similar to those in the first exemplary embodiment and are, therefore, omitted from illustration and description.

<Correction Candidate Generation in Case of Polyline Data>

Figure 24A:
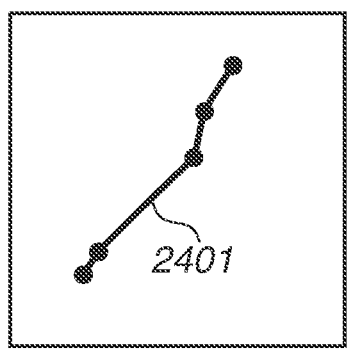
FIGS. 24A, 24B, 24C, and 24D are diagrams used to explain an example of generating a correction candidate in a fifth exemplary embodiment.
Figure 24B:
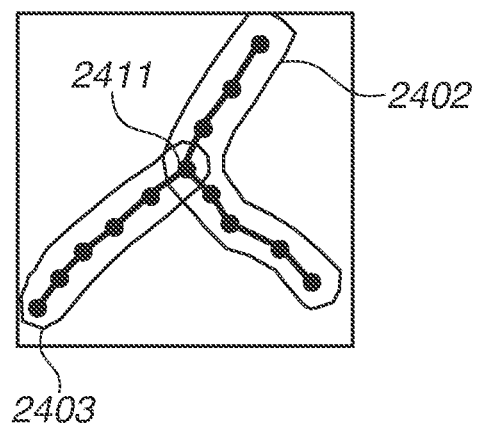

Processing for generating a correction candidate in a case where attribute information about defect data is expressed by vector data is described with reference to FIGS. 24A, 24B, 24C, and 24D. Defect data in the fifth exemplary embodiment is assumed to be a crack on the wall surface of a structure as with the first exemplary embodiment. In FIGS. 24A to 24D, coordinate points of vector data are indicated by filled circles, and a defect is expressed by connecting contiguous coordinate points with line segments. FIG. 24A is a diagram illustrating a reference defect 2401, and FIG. 24B is a diagram illustrating correction target defects 2402 and 2403. The correction target defects 2402 and 2403 are assumed to be adjacent to each other at coordinates 2411.

In generating a correction candidate from the correction target defects 2402 and 2403, the correction candidate generation unit 124 in the fifth exemplary embodiment is able to use a method similar to the generation method for a correction candidate in the first exemplary embodiment. Thus, the correction candidate generation unit 124 cuts a part of the correction target defect and then joins the defects to each other, thus being able to generate, as a correction candidate, defect data having a branching different from the branching of shape data obtained before cutting (correction target defect). Particularly, in a case where, as in the fifth exemplary embodiment, attribute information about defect data is expressed by vector data, the correction candidate generation unit 124 sets, as a cutting position, coordinates (branching point) at which a plurality of correction target defects is adjacent to each other.

Figure 24C:
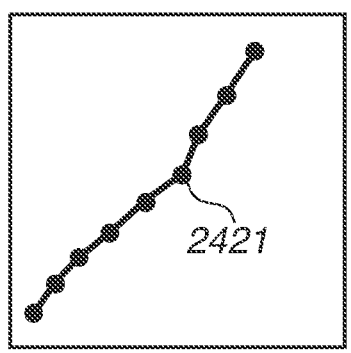
Figure 24D:
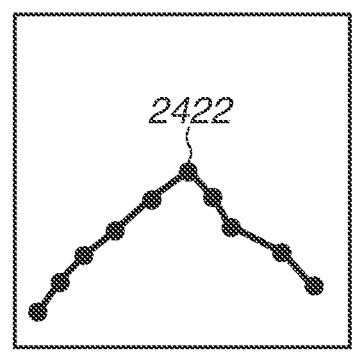

FIG. 24C is a diagram illustrating an example of a result in which a correction candidate 2421 has been generated from the correction target defects 2402 and 2403, and FIG. 24D is a diagram illustrating an example of a result in which a correction candidate 2422 differing in branching from the correction candidate 2421 has been generated from the correction target defects 2402 and 2403. As illustrated in FIGS. 24C and 24D, in a case where attribute information about defect data is expressed by vector data, the correction candidate generation unit 124 is able to generate a correction candidate by switching a joining relationship of the branching point portion out of coordinate points configuring vector data.

According to the information processing apparatus 100 in the fifth exemplary embodiment described above, even in a case where attribute information about defect data is expressed by vector data, it is possible to generate a correction candidate from a correction target defect and to perform correction of defect data and calculation of a progress level.

Some embodiments can be implemented by processing for supplying a program for implementing one or more functions of the above-described exemplary embodiments to a system or apparatus via a network or a storage medium and causing one or more processors in a computer of the system or apparatus to read out and execute the program. Moreover, some embodiments can be implemented by a circuit which implements such one or more functions (for example, an application specific integrated circuit (ASIC)).

Each of the above-described exemplary embodiments is merely an example of embodying the present disclosure, and should not be construed to limit the technical scope of the present disclosure.

Thus, some embodiments can be implemented in various fashions without departing from the technical idea thereof or the principal characteristics thereof.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-084603, which was filed on May 19, 2021 and which is hereby incorporated by reference herein in its entirety.

What is claimed is:

1. An information processing apparatus comprising:
a selection unit configured to select, as a reference defect, at least one defect from among first defects associated with a first image and to select, as a correction target defect, at least one defect from among second defects associated with a second image captured at a time different from an image capturing time of the first image;
a candidate generation unit configured to generate a correction candidate by modifying the correction target defect;
a matching level acquisition unit configured to acquire a matching level representing a matching relationship between the reference defect and the correction candidate;
a defect correction unit configured to generate a corrected defect by correcting the correction target defect based on the matching level; and
a progress level acquisition unit configured to acquire a progress level representing a change in defect from the reference defect based on a comparison between the reference defect and the corrected defect.

2. The information processing apparatus according to claim 1, wherein the candidate generation unit generates the correction candidate having a joining relationship different from a joining relationship of the correction target defect by performing at least one of cutting processing and joining processing on the correction target defect.

3. The information processing apparatus according to claim 1, wherein the candidate generation unit generates the correction candidate by changing at least one of a position and shape of the correction target defect.

4. The information processing apparatus according to claim 1, wherein the matching level acquisition unit calculates the matching level based on a degree of overlap obtained by expanding and then superimposing shapes of the reference defect and the correction candidate on each other.

5. The information processing apparatus according to claim 1, wherein the candidate generation unit sets, as an invisible defect, a defect portion included in the reference defect and overlapping a partial defect of the second defects, and, with use of the invisible defect and at least a partial defect of the correction target defect, generates, as the correction candidate, a defect with a shape different from a shape of the correction target defect.

6. The information processing apparatus according to claim 1, further comprising a display unit configured to display the progress level acquired by the progress level acquisition unit.

7. The information processing apparatus according to claim 1,
wherein the candidate generation unit generates the correction candidate by modifying attribute information about the correction target defect,
wherein the defect correction unit generates the corrected defect having a relationship corresponding to the reference defect by correcting the attribute information about the correction target defect based on the matching level, and
wherein the progress level acquisition unit calculates the progress level based on a comparison between attribute information about the reference defect and attribute information about the corrected defect.

8. The information processing apparatus according to claim 7,
wherein the candidate generation unit generates a plurality of correction candidates each corresponding to the correction candidate by modifying the attribute information about the correction target defect,
wherein the information processing apparatus further comprises a candidate selection unit configured to select one correction candidate from the plurality of correction candidates, and
wherein the defect correction unit generates the corrected gradation by correcting, based on the matching level, the attribute information about the correction target defect associated with generation of the correction candidate selected by the candidate selection unit.

9. The information processing apparatus according to claim 7, wherein the matching level acquisition unit calculates a feature quantity of each defect based on the attribute information about the reference defect and attribute information about the correction candidate, and calculates the matching level based on the feature quantity.

10. The information processing apparatus according to claim 7, wherein the defect correction unit generates the corrected defect by performing, on a partial defect of the correction target defect, changing of a shape and changing of the attribute information based on the matching level.

11. The information processing apparatus according to claim 7, wherein the progress level acquisition unit calculates, as the progress level, a difference between the attribute information about the reference defect and the attribute information about the corrected defect.

12. The information processing apparatus according to claim 7, further comprising a determination unit configured to calculate a determination index based on the attribute information about the reference defect and attribute information about a partial defect of the correction target defect and to determine whether to generate the correction candidate based on a comparison between the determination index and a threshold value.

13. An information processing apparatus comprising:
a selection unit configured to select, as a reference defect group, a plurality of defects from among first defects associated with a first image and to select, as a correction target defect group, a plurality of defects from among second defects associated with a second image captured at a time different from an image capturing time of the first image;
a candidate generation unit configured to generate a correction candidate group by modifying the correction target defect group;
a matching level acquisition unit configured to acquire a group matching level representing a matching relationship between the reference defect group and the correction candidate group;
a defect correction unit configured to generate a corrected defect group by correcting the correction target defect group based on the group matching level; and
a progress level acquisition unit configured to acquire a group progress level representing a change from the reference defect group based on a comparison between the reference defect group and the corrected defect group.

14. The information processing apparatus according to claim 13,
wherein the candidate generation unit generates the correction candidate group by modifying attribute information about the correction target defect group,
wherein the defect correction unit generates the corrected defect group having a relationship corresponding to the reference defect group by correcting the attribute information about the correction target defect group based on the group matching level, and
wherein the progress level acquisition unit calculates the group progress level based on a comparison between attribute information about the reference defect group and attribute information about the corrected defect group.

15. The information processing apparatus according to claim 14, wherein the matching level acquisition unit calculates the group matching level representing the matching relationship between the reference defect group and the correction candidate group based on aggregated data about the attribute information associated with defects included in the reference defect group and aggregated data about the attribute information associated with defects included in the correction candidate group.

16. The information processing apparatus according to claim 15, wherein the matching level acquisition unit calculates the group matching level using, as the aggregated data, at least one of a degree of coincidence between the attribute information about the reference defect group and the attribute information about the correction candidate group, a degree of change between a number of pieces of the attribute information about the reference defect group and a number of pieces of the attribute information about the correction candidate group, and a degree of coincidence in change rate between the attribute information about the reference defect group and the attribute information about the correction candidate group.

17. An information processing apparatus comprising:
a selection unit configured to select, as a reference defect, at least one defect from among first defects associated with a first image;
a candidate generation unit configured to generate, as second defects, at least one defect using a trained model from a second image captured at a time different from an image capturing time of the first image and to generate, as a correction candidate, a defect corresponding to the reference defect included in the second defects;
a matching level acquisition unit configured to acquire a matching level representing a matching relationship between the reference defect and the correction candidate;
a defect correction unit configured to generate a corrected defect by correcting attribute information about the correction candidate based on the matching level; and
a progress level acquisition unit configured to acquire a progress level representing a change in defect from the reference defect based on a comparison between attribute information about the reference defect and attribute information about the corrected defect.

18. The information processing apparatus according to claim 7, wherein the attribute information is information representing a property included in the defect and includes at least one of pieces of information about an extension, an area, a position, a width, coordinates, and a joining relationship of the defect.

19. The information processing apparatus according to claim 14, wherein the attribute information is information representing a property included in the defect and includes at least one of pieces of information about an extension, an area, a position, a width, coordinates, and a joining relationship of the defect.

20. The information processing apparatus according to claim 17, wherein the attribute information is information representing a property included in the defect and includes at least one of pieces of information about an extension, an area, a position, a width, coordinates, and a joining relationship of the defect.

21. The information processing apparatus according to claim 1, wherein the defect includes a crack occurring at a surface of a structure.

22. The information processing apparatus according to claim 13, wherein the defect includes a crack occurring at a surface of a structure.

23. The information processing apparatus according to claim 17, wherein the defect includes a crack occurring at a surface of a structure.

24. An information processing method which an information processing apparatus performs, the information processing method comprising:
selecting, as a reference defect, at least one defect from among first defects associated with a first image and selecting, as a correction target defect, at least one defect from among second defects associated with a second image captured at a time different from an image capturing time of the first image;
generating a correction candidate by modifying the correction target defect;
acquiring a matching level representing a matching relationship between the reference defect and the correction candidate;
generating a corrected defect by correcting the correction target defect based on the matching level; and
acquiring a progress level representing a change in defect from the reference defect based on a comparison between the reference defect and the corrected defect.

25. An information processing method which an information processing apparatus performs, the information processing method comprising:
- selecting, as a reference defect group, a plurality of defects from among first defects associated with a first image and selecting, as a correction target defect group, a plurality of defects from among second defects associated with a second image captured at a time different from an image capturing time of the first image;
- generating a correction candidate group by modifying the correction target defect group;
- acquiring a group matching level representing a matching relationship between the reference defect group and the correction candidate group;
- generating a corrected defect group by correcting the correction target defect group based on the group matching level; and
- acquiring a group progress level representing a change from the reference defect group based on a comparison between the reference defect group and the corrected defect group.

26. An information processing method which an information processing apparatus performs, the information processing method comprising:
- selecting, as a reference defect, at least one defect from among first defects associated with a first image;
- generating, as second defects, at least one defect using a trained model from a second image captured at a time different from an image capturing time of the first image and generating, as a correction candidate, a defect corresponding to the reference defect included in the second defects;
- acquiring a matching level representing a matching relationship between the reference defect and the correction candidate;
- generating a corrected defect by correcting attribute information about the correction candidate based on the matching level; and
- acquiring a progress level representing a change in defect from the reference defect based on a comparison between attribute information about the reference defect and attribute information about the corrected defect.

27. A non-transitory computer-readable storage medium storing instructions which, when executed by a computer comprising a processor and a memory, cause the computer to perform a method comprising:
- selecting, as a reference defect, at least one defect from among first defects associated with a first image and selecting, as a correction target defect, at least one defect from among second defects associated with a second image captured at a time different from an image capturing time of the first image;
- generating a correction candidate by modifying the correction target defect;
- acquiring a matching level representing a matching relationship between the reference defect and the correction candidate;
- generating a corrected defect by correcting the correction target defect based on the matching level; and
- acquiring a progress level representing a change in defect from the reference defect based on a comparison between the reference defect and the corrected defect.

28. A non-transitory computer-readable storage medium storing instructions which, when executed by a computer comprising a processor and a memory, cause the computer to perform a method comprising:
- selecting, as a reference defect group, a plurality of defects from among first defects associated with a first image and selecting, as a correction target defect group, a plurality of defects from among second defects associated with a second image captured at a time different from an image capturing time of the first image;
- generating a correction candidate group by modifying the correction target defect group;
- acquiring a group matching level representing a matching relationship between the reference defect group and the correction candidate group;
- generating a corrected defect group by correcting the correction target defect group based on the group matching level; and
- acquiring a group progress level representing a change from the reference defect group based on a comparison between the reference defect group and the corrected defect group.

29. A non-transitory computer-readable storage medium storing instructions which, when executed by a computer comprising a processor and a memory, cause the computer to perform a method comprising:
- selecting, as a reference defect, at least one defect from among first defects associated with a first image;
- generating, as second defects, at least one defect using a trained model from a second image captured at a time different from an image capturing time of the first image and generating, as a correction candidate, a defect corresponding to the reference defect included in the second defects;
- acquiring a matching level representing a matching relationship between the reference defect and the correction candidate;
- generating a corrected defect by correcting attribute information about the correction candidate based on the matching level; and
- acquiring a progress level representing a change in defect from the reference defect based on a comparison between attribute information about the reference defect and attribute information about the corrected defect.

* * * * *